United States Patent
Moon

(10) Patent No.: US 9,477,345 B2
(45) Date of Patent: Oct. 25, 2016

(54) DISPLAY DEVICE, AND DEVICE AND METHOD FOR DRIVING THE SAME

(71) Applicant: LG Display Co., Ltd., Seoul (KR)

(72) Inventor: Suhwan Moon, Gyeongsangbuk-do (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 14/922,097

(22) Filed: Oct. 23, 2015

(65) Prior Publication Data

US 2016/0224175 A1   Aug. 4, 2016

(30) Foreign Application Priority Data

Jan. 30, 2015   (KR) .................. 10-2015-0015523
Aug. 31, 2015   (KR) .................. 10-2015-0123267

(51) Int. Cl.
*G06F 3/041*   (2006.01)
*G09G 3/20*    (2006.01)

(52) U.S. Cl.
CPC ........... *G06F 3/0416* (2013.01); *G06F 3/0412* (2013.01); *G09G 3/20* (2013.01); *G09G 2300/0426* (2013.01); *G09G 2310/0272* (2013.01); *G09G 2310/0289* (2013.01); *G09G 2310/08* (2013.01)

(58) Field of Classification Search
None
See application file for complete search history.

(56) References Cited

U.S. PATENT DOCUMENTS

2013/0335367 A1* 12/2013 Kim ................. G09G 3/3696
                                                    345/174
2014/0015770 A1*  1/2014 Lee .................... G06F 3/041
                                                    345/173
2014/0267214 A1   9/2014 Hwang et al.

FOREIGN PATENT DOCUMENTS

EP    1918938 A2    5/2008

OTHER PUBLICATIONS

European Extended Search Report, European Application No. 15191442.1, Mar. 9, 2016, 5 pages.

* cited by examiner

*Primary Examiner* — Srilakshmi K Kumar
*Assistant Examiner* — Stephen T Reed
(74) *Attorney, Agent, or Firm* — Fenwick & West LLP

(57) ABSTRACT

A display device and a device and method for driving the same are provided. The display device minimizes leakage of a stage in a standby state to hold a voltage of a Q node of the stage during touch operation.

20 Claims, 40 Drawing Sheets

FIG. 18A

| | | |
|---|---|---|
| 1 | Normal | ↑ ↑ |
| ... | Normal | |
| 63 | Normal | |
| 64 | B | |
| | C | Forward gate scan |
| 65 | A | Reverse gate scan |
| 66 | Normal | |
| ... | Normal | |
| 127 | Normal | |
| 128 | B | |
| | C | |
| 129 | A | |
| 130 | Normal | |
| ... | Normal | |
| 1280 | Normal | ↓ |

FIG. 18B

| | | |
|---|---|---|
| 1 | Normal | ↑ ↑ |
| ... | Normal | |
| 63 | Normal | |
| 64 | B | |
| 65 | A | Forward gate scan |
| 66 | Normal | Reverse gate scan |
| ... | Normal | |
| 127 | Normal | |
| 128 | B | |
| 129 | A | |
| 130 | Normal | |
| ... | Normal | |
| 1280 | Normal | ↓ |

<Reverse driving>

<Reverse driving>

<Forward driving>

<Forward driving(Holding Time)>

<Forward driving>

<Forward driving>

<Forward driving>

<Forward driving>

DISPLAY DEVICE, AND DEVICE AND METHOD FOR DRIVING THE SAME

CROSS-REFERENCE TO RELATED APPLICATIONS

This patent application claims priority under 35 U.S.C 119(a) to Republic of Korea patent application no. 10-2015-0015523 filed on Jan. 30, 2015 and Republic of Korea patent application no. 10-2015-0123267 filed on Aug. 31, 2015, both of which are incorporated by reference herein in their entirety.

BACKGROUND

1. Field

The present invention relates to a display device, and a device and method for driving the same.

2. Related Art

A touchscreen is an input device which is provided to an image display device, such as a liquid crystal display, a field emission display (FED), a plasma display panel (PDP), an electroluminescence device (EL) and an electrophoretic display such that a user inputs predetermined information into the image display device by pressing (or touching) a touch sensor included in the touchscreen while watching the image display device.

A driver circuit of a display device includes a pixel array that displays an image, a data driver circuit that supplies a data signal to data lines of the pixel array, a gate driver circuit (or a scan driver circuit) that sequentially supplies a gate pulse (or a scan pulse) synchronized with the data signal to gate lines (or scan lines) of the pixel array, and a timing controller that controls the data driver circuit and the gate driver circuit.

Pixels each may include a Thin Film Transistor (TFT) that supplies a voltage of a data line to a pixel electrode in response to gate pulses. The gate pulses swing between a Gate High Voltage (VGH) and a Gate Low Voltage (VGL). The VGH is a turn-on voltage of a transistor and is set to a voltage higher than a threshold voltage in an n-type Metal Oxide Semiconductor Field Effect Transistor (MOSFET). The VGH is a turn-off voltage of a transistor and is set to a voltage lower than a threshold voltage in an n-type MOSFET.

Nowadays, technology that houses a gate driver circuit together with a pixel array in a display panel has been applied. Hereinafter, a Gate In Panel (GIP) is a gate driver circuit housed in the display panel. The gate driver circuit includes a shift register. The shift register includes a plurality of stages connected in cascade connection. Stages generate an output in response to a start pulse and shift the output according to a shift clock.

Stages of the shift register include a Q node that charges a gate line, a QB node that discharges a gate line, and a switch circuit connected to the Q node and the QB node. The switch circuit raises a voltage of the gate line by charging the Q node in response to a start pulse or an output of a previous stage and discharges the QB node in response to an output of a next stage or a reset pulse. The switch circuit may be implemented with TFTs of a MOSFET structure.

A touchscreen can be classified into add-on type, on-cell type and in-cell type touchscreens according to the structure thereof. The add-on type touchscreen is configured in such a manner that a display device and a touchscreen are separately manufactured and then the touchscreen is attached to the upper substrate of the display device. The on-cell type touchscreen is constructed in such a manner that elements constituting a touchscreen are directly formed on the surface of an upper glass substrate of a display device. The in-cell type touchscreen can achieve a thin display device by embedding a touchscreen in the display device and improve durability. However, the add-on type touchscreen has problems that the touchscreen is mounted on the display device to increase the thickness of the display device and reduce the brightness of the display device so as to decrease visibility. The on-cell type touchscreen can reduce the thickness of the display device, compared to the add-on type touchscreen, since a separate touchscreen is formed on the surface of the display device but still has problems that the thickness of the display device and the number of manufacturing processes are increased due to driving electrodes and sensing electrodes constituting the touchscreen and insulating layers for insulating the driving electrodes and the sensing electrodes, thereby increasing manufacturing costs.

The in-cell touchscreen can solve the problems of the add-on type and on-cell type touchscreens since durability thereof can be improved and the thickness thereof can be reduced. The in-cell type touchscreen can be classified into an optical touchscreen and a capacitive touchscreen.

The optical touchscreen has a light sensing layer formed on a thin film transistor array of a display device such that light reflected through an object corresponding to a touched point is recognized by using light from a backlight unit or infrared light. However, while the optical touchscreen shows relatively stabilized driving performance in a dark environment, light stronger than reflected light acts as noise in a bright environment. This is because intensity of light reflected by touch is very low and thus touch recognition error may be generated even when surroundings are slightly bright. Particularly, the optical touchscreen has a problem that touch may not be recognized when the surrounding environment is exposed to sunlight due to remarkably high intensity of light.

The capacitive touchscreen can be classified into a self-capacitance type and a mutual capacitance type. The mutual capacitance type touchscreen is configured in such a manner that a common electrode is divided into driving electrodes and sensing electrodes such that mutual capacitance is generated between the driving electrodes and the sensing electrodes to as to recognize touch by measuring mutual capacitance variation generated when touch is applied thereto. However, the mutual capacitance touchscreen cannot correctly recognize a touch point since mutual capacitance generated during touch recognition is very small whereas parasitic capacitance between a gate line and a data line constituting the display device including the touchscreen is very large. In addition, the mutual capacitance touchscreen requires a very complicated interconnection structure because a plurality of touch driving lines for touch operation and a plurality of touch sensing lines for touch sensing need to be formed on common electrodes. To solve this problem, there has been proposed a separate display and touch driving method by which a plurality of electrodes, which is formed to overlap a plurality of pixel electrodes in a display area of a panel, operates as common electrodes for driving liquid crystal along with pixel electrodes respectively formed at pixels for a display time and operates as touch electrodes for sensing touch points according to a touch scan signal supplied from a touch driver circuit for a touch time.

In the separate display and touch driving method, stages constituting a shift register of a gate driver circuit include a stage having a Q node holding in a standby state for touch time. The Q node of the stage is in a floating state in which power is not supplied for the touch time and thus voltage drop due to leakage current occurs. Such problem leads to abnormal signal output to a gate line, resulting in defects such as dim that a horizontal line appears on the display panel corresponding to the gate line. Furthermore, the voltage drop at the Q node of the standby stage increases the touch time.

SUMMARY

An object of the present invention is to provide a display device, and a device and method for driving the same for minimizing a leakage current of a stage in a standby state during touch operation so as to hold a voltage of a Q node of the stage.

Another object of the present invention is to provide a display device, and a device and method for driving the same capable of securing a clock time at high resolution by reducing a margin time between a display time and a touch time.

Another object of the present invention is to provide a display device, and a device and method for driving the same capable of increasing a touch time according to stable Q-node voltage holding of a standby stage.

To accomplish the object of the present invention, there is provided a gate driver circuit configured to time-divide one frame into a display time and a touch time in which a touch enable signal has a first level or a second level, the gate driver circuit comprising an N-th stage which includes: a first transistor controlled by an output signal of a previous stage and supplying the touch enable signal having the first level to a Q node; a second transistor controlled by an output signal of a next stage and supplying the touch enable signal having the second level to the Q node; and a pull-up transistor controlled by a voltage of the Q node to output a first clock signal applied thereto to an N-th output terminal, wherein the first level is a high level and the second level is a low level when the first transistor, the second transistor and the pull-up transistor are N-type transistors, and the first level is a low level and the second level is a high level when the first transistor, the second transistor and the pull-up transistor are P-type transistors. Accordingly, the voltage of the Q node can be held without being decreased and even increased during bootstrapping by supplying the high-level VTEN corresponding to the high-level source voltage to a source or drain terminal opposite the Q node on a source-drain path through which charges of the Q node can leak.

The present invention can provide a gate driver circuit capable of minimizing leakage current of a stage in a standby state during touch operation so as to hold a voltage of a Q node of the stage, securing a clock time at high resolution by reducing a margin time between a display time and a touch time, and increasing the touch time according to stable Q-node voltage holding of a standby stage, and a touchscreen integrated display device including the same

BRIEF DESCRIPTION OF THE DRAWINGS

FIG. 18A is a diagram illustrating forward and reverse gate scanning of a shift register according to the first and third embodiments.

FIG. 18B is a diagram illustrating forward and reverse gate scanning of a shift register according to the second and fourth embodiments.

DETAILED DESCRIPTION

Figure 1:
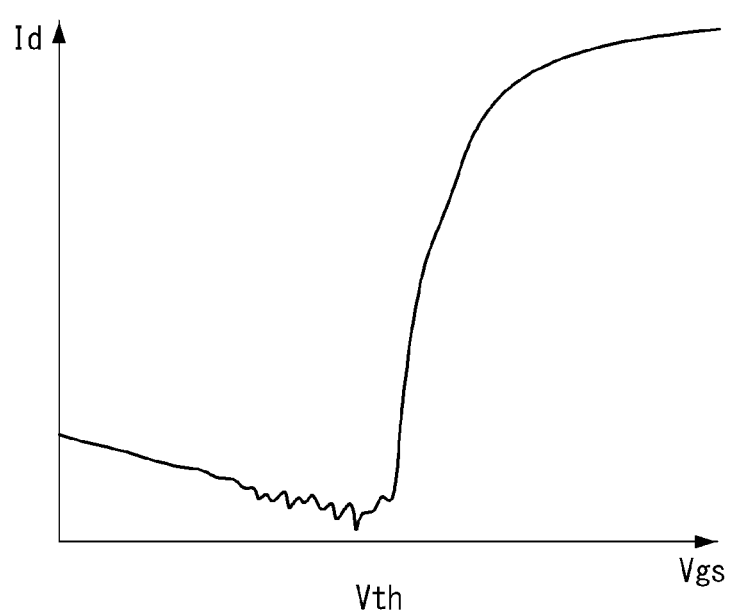
FIG. 1 is a diagram illustrating Id according to Vgs of an n-type MOSFET.

A description will be given of a gate driver circuit and a touchscreen integrated display device including the same according to embodiments of the present invention with reference to the attached drawings. The above and other aspects of the present invention will be described in detail through preferred embodiments so that the present invention can be easily understood and realized by those skilled in the art. Modifications to the preferred embodiment will be readily apparent to those of ordinary skill in the art, and the disclosure set forth herein may be applied to other embodiments and applications without departing from the spirit and scope of the present invention and the appended claims. In the drawings, the dimension and thickness of a device may be exaggerated for clarity. Like numbers refer to like elements throughout the description of the figures.

Features and advantages of the present invention and methods for accomplishing the same will be apparent upon examination of the following figures and detailed description. Embodiments may, however, be embodied in many different forms and should not be construed as being limited to embodiments set forth herein; rather, embodiments may be provided so that this disclosure will be thorough and complete, and will fully convey the concept to those skilled in the art. Like numbers refer to like elements throughout the description of the figures. In the drawings, dimensions and relative dimensions of layers and regions may be exaggerated for clarity and convenience of description.

It will be understood that when an element is referred to as being "on" another element, it can be directly on the other element or intervening elements may be present therebetween. In contrast, when an element is referred to as being "directly on" another element, there are no intervening elements present.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In a gate driver circuit of the present invention, switch elements may be implemented with a transistor of an n-type or p-type MOSFET structure. In the following embodiment, an n-type transistor is illustrated, but the present invention is not limited thereto. The transistor is a three-electrode element including a gate, a source, and a drain. The source is an electrode that supplies carriers to the transistor. Carriers start to flow from the source within the transistor. The drain is an electrode in which carriers are discharged to the outside in the transistor. That is, in a MOSFET, carriers flow from the source to the drain. In an n-type MOSFET (NMOS), because carriers are an electron, in order to enable electrons to flow from the source to the drain, a source voltage is lower than a drain voltage. In the n-type MOSFET, because electrons flow from the source toward the drain, a current flows from the drain toward the source. In the p-type MOSFET (PMOS), because a carrier is a hole, in order to enable holes to flow from the source to the drain, a source voltage is higher than a drain voltage. In the p-type MOSFET, because holes flow from the source toward the drain, a current flows from the source toward the drain. It should be noted that the source and the drain of the MOSFET are not fixed. For example, the source and the drain of the MOSFET may be changed according to an applied voltage. In the following embodiment, due to a source and a drain of the transistor, the present invention is not limited.

The present invention time-divides 1 frame period into at least one touch time and at least one display time to drive pixels and touch sensors. The display times are separated with a touch time interposed therebetween. A shift register of the gate driver circuit should not generate an output during a touch time and should generate a next output from when a next display time resumes. However, a Q node voltage of the shift register discharges during a touch time, and when the next display time resumes, a voltage of a gate pulse is lowered and thus noise of a line form may occur in which a charge amount of pixels connected to the same gate line is lowered.

Figure 2:
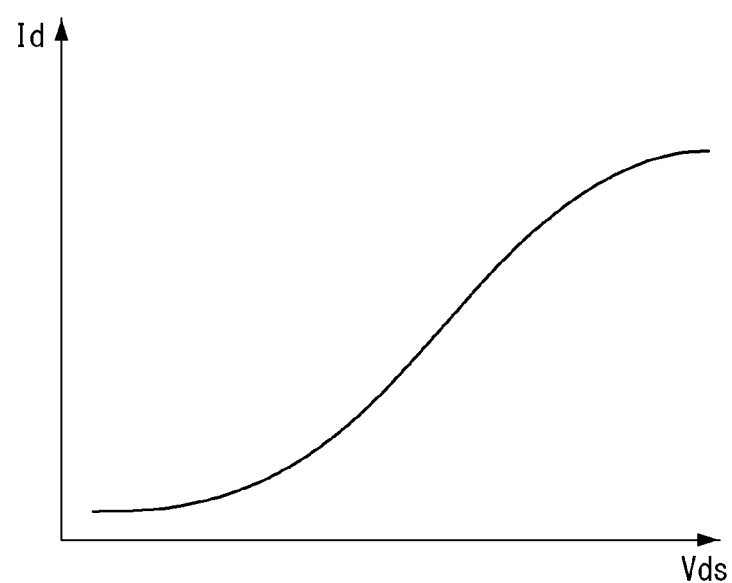
FIG. 2 is a diagram illustrating Id according to Vgs in a sub-threshold region of an n-type MOSFET.

When a voltage Vgs between a gate and a source of the transistor is lower than a threshold voltage Vth, the transistor is turned off and thus a drain current Id should not flow, but in an off state or a sub-threshold region of the transistor, leakage may occur. Actually, when Vgs is lower than Vth (Vgs<Vth), in an off state or a sub-threshold region of the transistor, a sub-threshold current occurs, as shown in FIG. 1. As a voltage Vds between a drain and a source and a voltage Vgs between a gate and a source of the transistor increases, leakage or a sub-threshold current increases, as shown in FIGS. 1 and 2. Such leakage is not large, but as a flow time of leakage is extended, a leakage amount increases to have a bad influence on a circuit operation and consume power. Further, as an operation temperature rises, leakage of the transistor increases, and when a semiconductor channel of the transistor is exposed, leakage increases proportional to intensity of light.

In the present invention, in order to minimize leakage of transistors connected on a discharge path of a Q node for a touch time, by reducing Vds in an off state (Vgs<Vth) of the transistor, discharge of the Q node is prevented.

Figure 3:
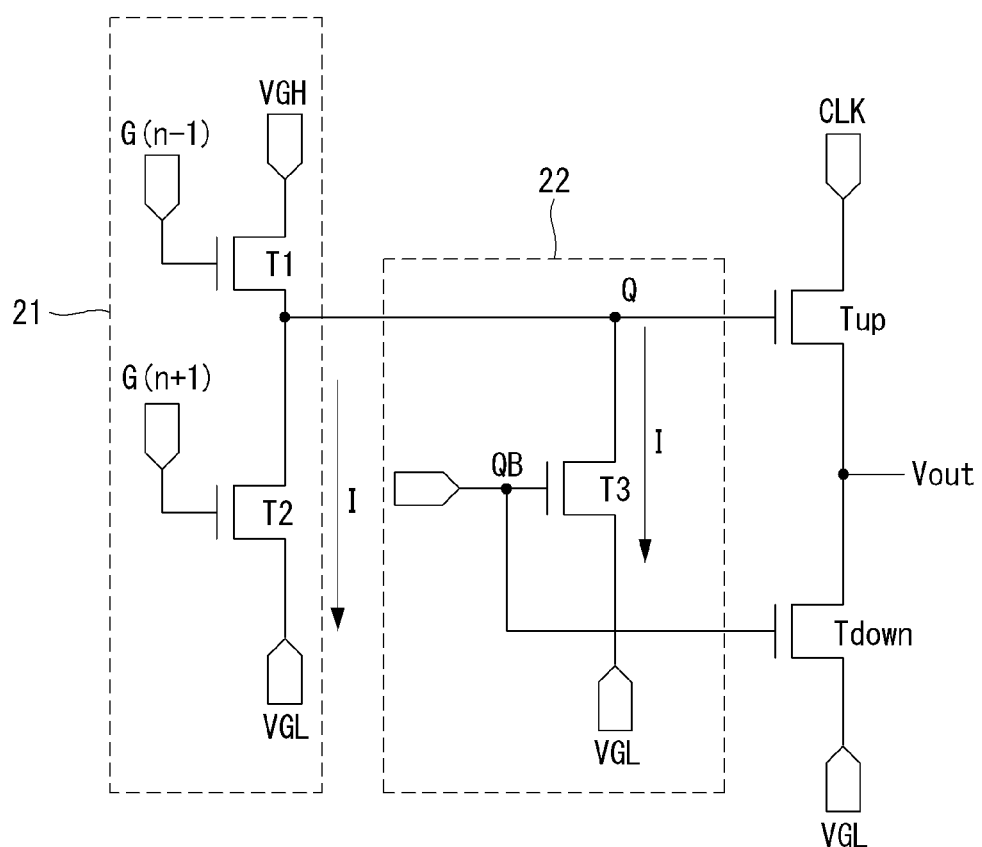
FIGS. 3 and 4 are diagrams illustrating an example in which a Q node may be discharged in a gate driver circuit.
Figure 4:
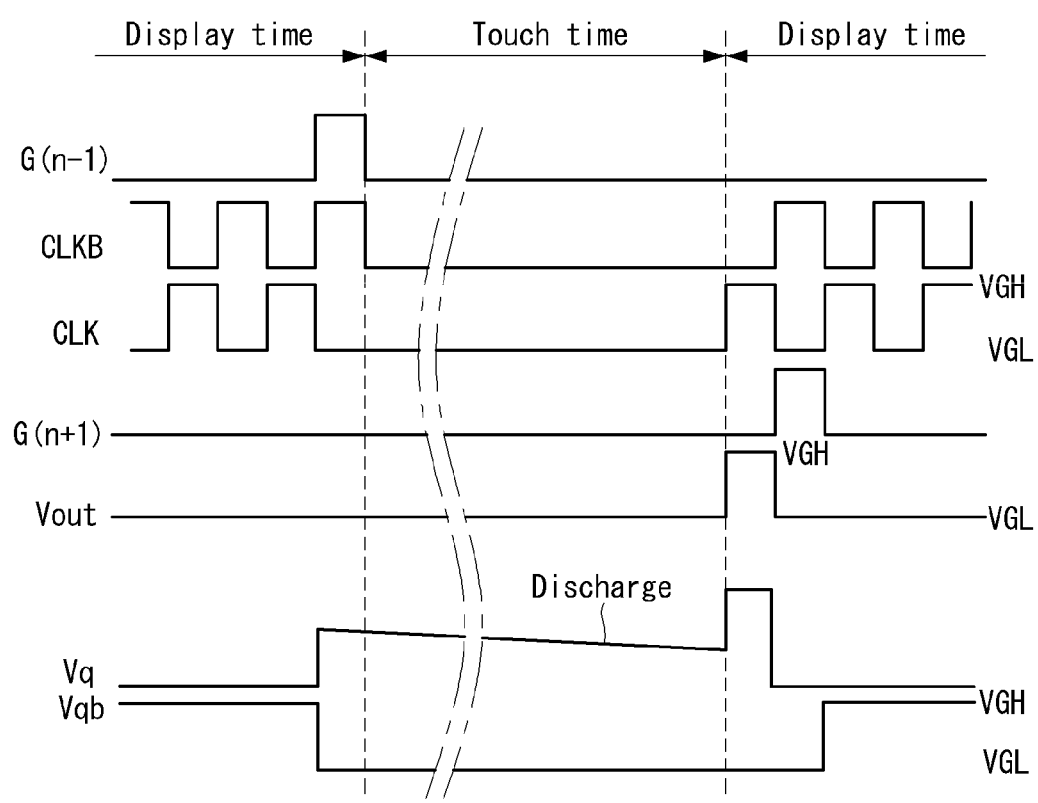

FIGS. 3 and 4 are diagrams illustrating an example in which a Q node may be discharged in a gate driver circuit. FIGS. 3 and 4 illustrate an n-th stage that generates an n-th output Vout by operating in a forward direction mode in a bi-directional shift register of a gate driver circuit. The gate driver circuit of FIGS. 3 and 4 illustrates a situation in which discharge of the Q node may occur and it should be noted that the gate driver circuit of FIGS. 3 and 4 is not conventional art known before the present application. The transistors of FIGS. 3 and 4 are n-type MOSFET, but the present invention is not limited thereto.

Referring to FIGS. 3 and 4, a shift register of the gate driver circuit includes stages connected in cascade connection. The stages each include a Q node that controls a pull-up transistor Tup, a charging/discharging unit 21 connected to the Q node, a Q node stabilizer 22, and a QB node that controls a pull-down transistor Tdown.

The charging/discharging unit 21 includes first and second transistors T1 and T2. The first and second transistors T1 and T2 charge/discharge a Q node. When a bi-directional shift register operates in a forward direction mode, the first transistor T1 charges a Q node in response to an output (Gn−1) of an (n−1)th stage, and the second transistor T2 discharges a Q node in response to an output Gn+1 of an (n+1)th stage. A drain of the first transistor T1 is connected to a forward direction power terminal and a source thereof is connected to a Q node. A gate of the first transistor T1 is connected to a first gate terminal. In a forward direction mode, a gate high voltage (VGH) is supplied to the forward direction power terminal. In a reverse direction mode, a gate low voltage (VGL) is supplied to the forward direction power terminal. A previous clock or an output G (n−1) of an (n-1)th stage is input to the first gate terminal. The previous clock is a clock having a phase earlier than that of an n-th clock CLK applied to the pull-up transistor Tup. A VGH is set to a voltage higher than a threshold voltage Vth of transistors T1, T2, and T3. A VGL is set to a voltage lower than a threshold voltage Vth of the transistors T1, T2, and T3.

A drain of the second transistor T2 is connected to the Q node and a source thereof is connected to a reverse direction power terminal. A gate of the second transistor T2 is connected to a second gate terminal. In a forward direction mode, a VGL is supplied to a reverse direction power terminal. In a reverse direction mode, a VGH is supplied to a reverse direction power terminal. A next clock or an output G (n+1) of an (n+1)th stage is input to the second gate terminal. The next clock is a clock having a phase later than that of the n-th clock CLK.

The Q node is pre-charged with a VGH from the charging/discharging unit 21, and when an n-th clock CLK is supplied to the pull-up transistor Tup, a potential thereof rises to 2 VGH due to bootstrapping to turn on the pull-up transistor Tup. The pull-up transistor Tup is turned on according to a Q node voltage to raise an output voltage Vout to a VGH potential with an n-th clock CLK of a VGH. A gate of the pull-up transistor Tup is connected to the Q node. A drain of the pull-up transistor Tup is connected to a clock terminal. A source of the pull-up transistor Tup is connected to an output terminal. An n-th clock CLK is input to the clock terminal.

The Q node stabilizer 22 includes a third transistor T3. The third transistor T3 discharges the Q node in response to a QB node. A QB control signal generated based on an n-th clock CLK and a clock applied to the first gate terminal or a clock that is not overlapped with a previous output (Gn−1) is input to the QB node. By simultaneously turning on the third transistor T3 and a pull-down transistor Tdown, the QB control signal pulls down an output voltage Vout while discharging the Q node. A gate of the third transistor T3 is connected to the QB node. A drain of the third transistor T3 is connected to the Q node. A source of the third transistor T3 is connected to a low potential power terminal. A VGL is supplied to the low potential power terminal.

By discharging an output terminal in response to a QB control signal, the pull-down transistor Tdown lowers an output voltage Vout to a VGL. A gate of the pull-down transistor Tdown is connected to the QB node. A drain of the pull-down transistor Tdown is connected to the output terminal. A source of the pull-down transistor Tdown is connected to the low potential power terminal.

A touch time is longer than 1 horizontal time of a display time. For the touch time, a VGL is applied to gates of the second and third transistors T2 and T3. Therefore, for a touch time, because Vgs of the second and third transistors T2 and T3 is 0, a current Ids between a drain and a source should ideally not exist, but Ids occurs due to leakage current and thus a voltage of the Q node is discharged. For a touch time, because a voltage Vds between a drain and a source of the transistors T2 and T3 is high by a difference voltage between VGH and VGL (Vds=Vq−VGL≈VGH−VGL), in an off state of the transistor, leakage current occurs. When a discharge time of the Q node is extended, a Q node voltage Vq is lowered and thus the gate driver circuit does not generate a normal output.

In FIG. 4, CLKB is a clock of inverse phase of an n-th clock CLK. Vqb is a voltage of the QB node.

In the present invention, in order to prevent such leakage at the Q-node, Vds is controlled to a minimum (Vds=0) in an off state (Vgs<Vth) of transistors T2 and T3 existing on a discharge path of the Q node for a touch time, as shown in FIGS. 5 to 8.

FIGS. 5 to 8 are diagrams illustrating prevention of discharge of a Q node according to an embodiment of the present invention.

Figure 5:
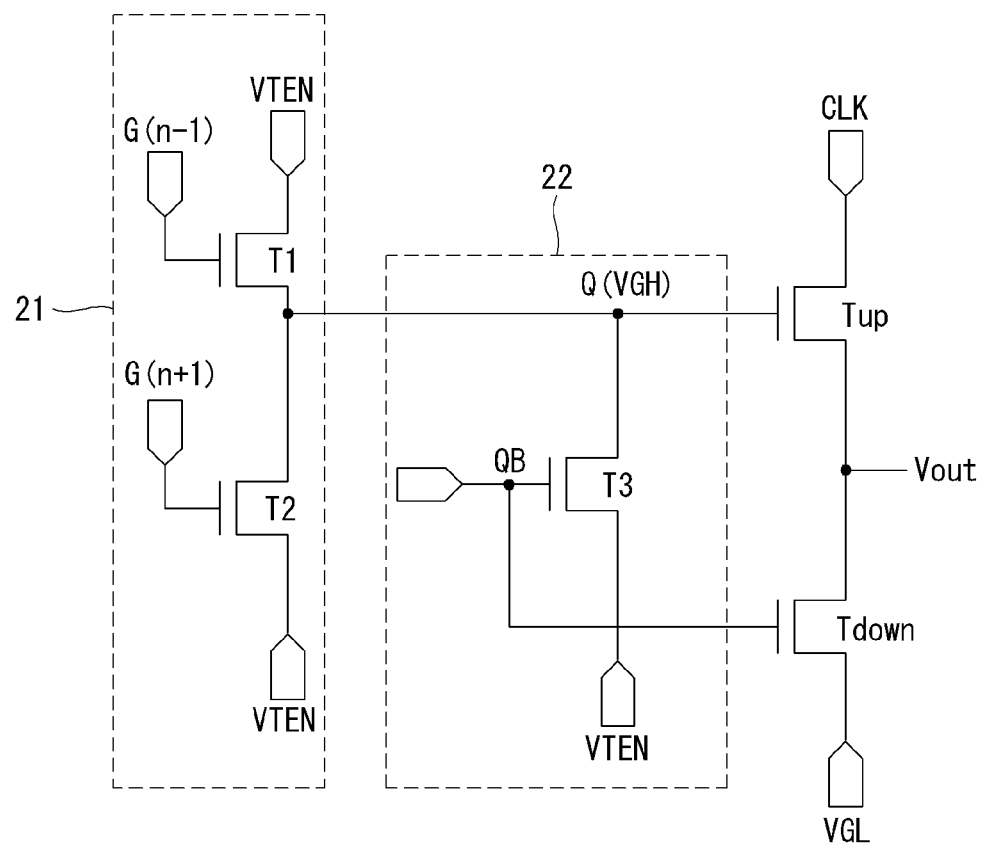
FIGS. 5, 6, 7, 8A, and 8B are diagrams illustrating prevention of discharge of a Q node according to an embodiment of the present invention.
Figure 6:
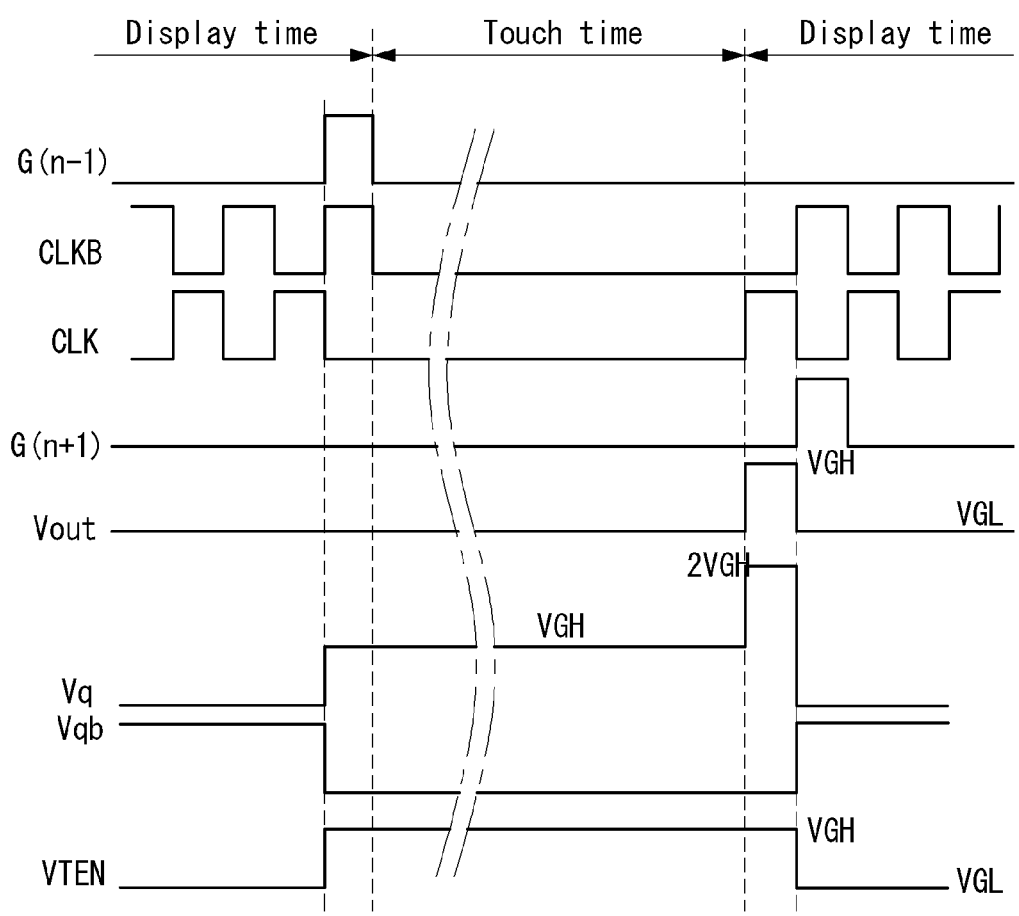

Referring to FIGS. 5 and 6, the present invention prevents discharge of the Q node for a touch time using an AC signal, i.e., a touch enable signal (VTEN). The VTEN is an AC signal that holds a low level voltage (=VGL) for a display time and that holds a high level voltage (=VGH) for a touch time.

For a touch time, a VGL is applied to gates of the transistors T1, T2, and T3 to hold an off state. For a touch time, VGH of the VTEN is supplied to the sources of the transistors T1, T2, and T3. The first transistor T1 charges a Q node with a VGH for a touch time. However, the second and third transistors T2 and T3 are connected to a discharge path of the Q node to suppress discharge of the Q node for a touch time. In this case, sources of the second and third transistors T2 and T3 may be regarded as a drain. Therefore, because Vds of each of the transistors T1, T2, and T3 becomes a minimum (Vds=0, substantially zero), leakage does not exist through transistors and thus the Q node is not discharged.

When a clock CLK is input, a voltage of the Q node rises to 2 VGH. In this case, in order to minimize Vds of the transistor, a voltage of the VTEN may be synchronized with the clock CLK to be risen to 2VGH.

For a touch time, at each of the transistors T1, T2, and T3, because Vds=Vq−VGH≈VGH−VGH=0, leakage does not exist. Therefore, in the present invention, a voltage Vq of the Q node may be almost constantly held for a touch time.

The reason of applying the VTEN to the first transistor T1 is to change a scan direction to a clock signal change. A dummy stage circuit of FIGS. 5 and 7 may be applied only to stages of a location in which a touch time starts and terminates among entire stages of the shift register. Other stages should use an existing stage circuit.

The VTEN may have a high level time wider than a touch time of FIG. 6 to correspond to a scanning direction change of the shift register. When the VTEN and a voltage of the QB node are simultaneously risen to a high level (=VGH), even if the first transistor T1 is not turned on, the Q node is charged through the third transistor T3 and thus an output Vout may rise to a high level (=VGH) at undesired timing. In consideration of this, when the VTEN is extended wider than a touch time, the VTEN is limited as follows. The VTEN should not rise to a high level (=VGH) earlier by 1 clock pulse width than the start of a touch time or should not fall to a low level (=VGL) later than 1 clock pulse width immediately after a touch time is terminated. 1 clock pulse width is 1 pulse width of a gate shift clock (CLK) applied to the shift register. In other words, when the VTEN is extended larger than a touch time, the VTEN should rise to a VGH level from a time later by a time within 1 clock pulse width than the start of a touch time and should fall to a VGL level at a time within 1 clock pulse width immediately after a touch time terminates.

Figure 7:
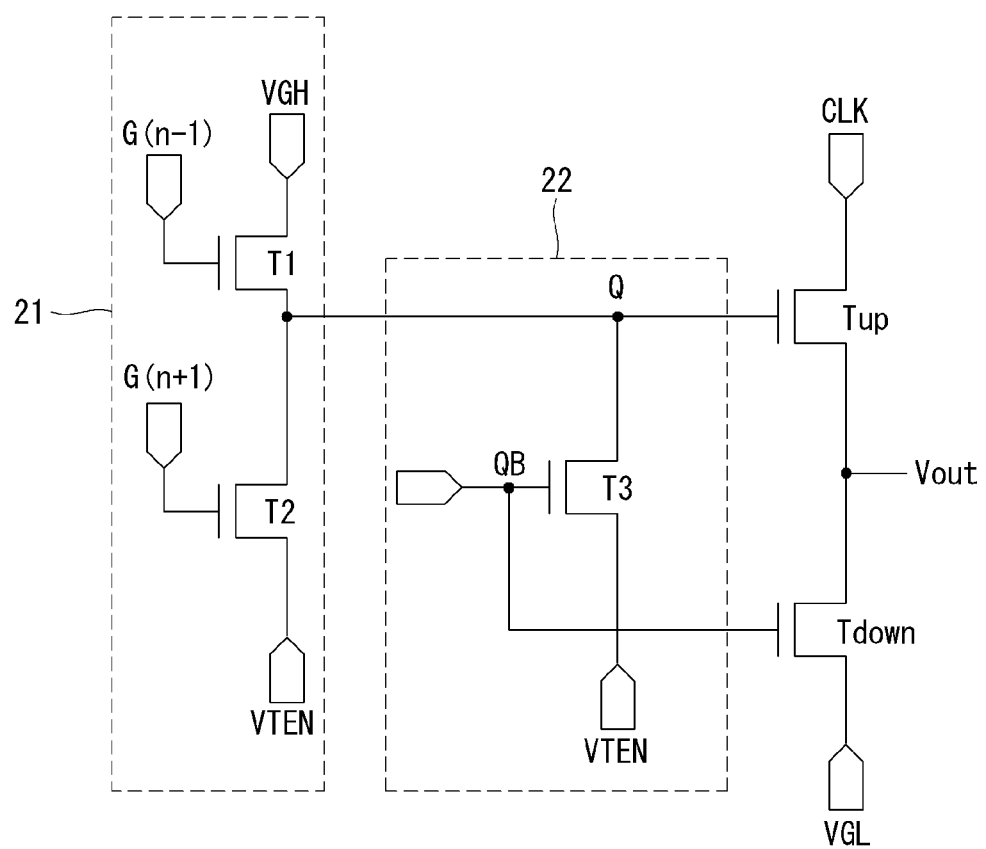
Figure 8A:
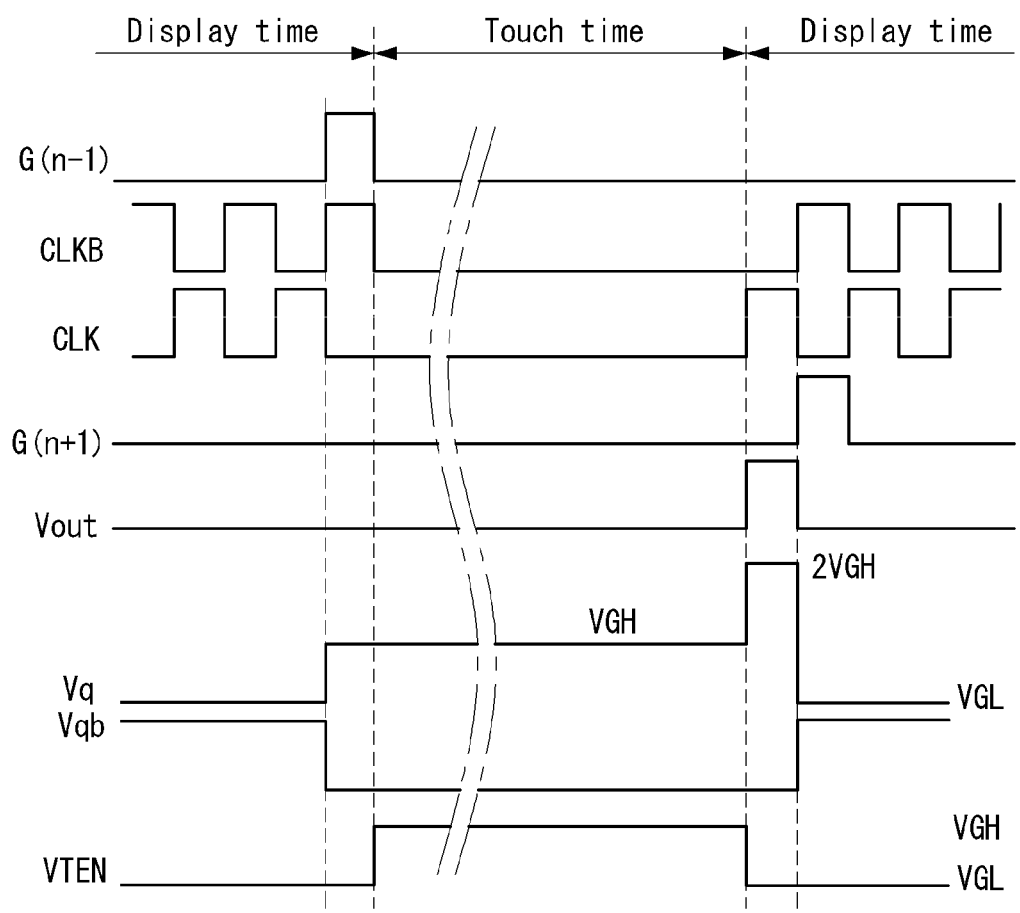
Figure 8B:
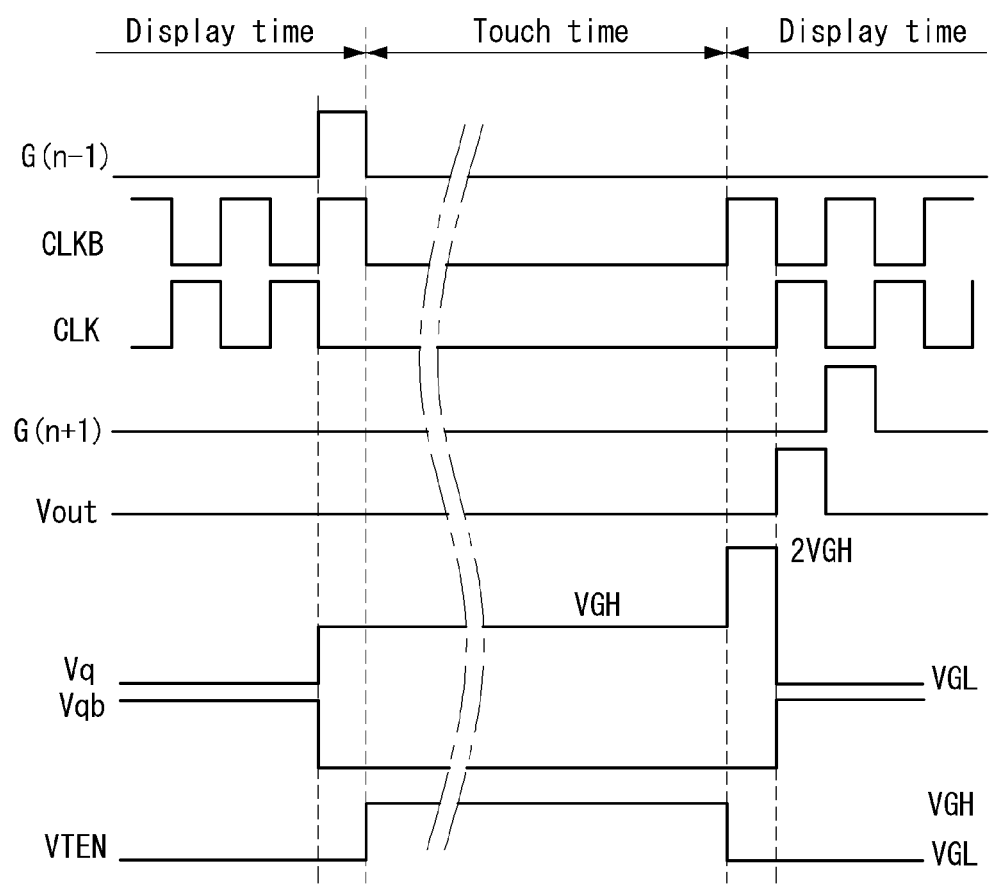

Referring to FIGS. 7 to 8B, a VGH may be applied to a drain of the first transistor T1. The present embodiment may apply a circuit of entire stages of the shift register to a circuit of FIG. 7 or may apply only to a specific stage.

A high level time of the VTEN may be synchronized with a touch time. The VTEN is raised to a VGH level simultaneously with the start of the touch time and is lowered to a VGL level when the touch time terminates.

FIG. 8A is an example of first enabling a CLK to a high level before a next display time is started after one touch time is terminated.

FIG. 8B is an example of first enabling a CLKB to a high level before a next display time is started after one touch time is terminated. The number of stages of a gate driving circuit to which the VTEN is applied is required as much as the number of a touch time set within 1 frame period. Among the stages, from a one touch time viewpoint, a stage that should hold a voltage of a Q node is one, and in the remaining states to which the VTEN is applied, a Q node and a QB node may be floated. In this case, in a state in which electric charges of the Q node are injected due to an external influence, when a CLK is immediately enabled, an undesired output may occur. Thus, CLKB is enabled before CLK is enabled, and, a display time operation is started after the Q node is initialized to a VGL and the QB node is initialized to a VGH. As a result, stability of a circuit operation can be enhanced.

Figure 9:
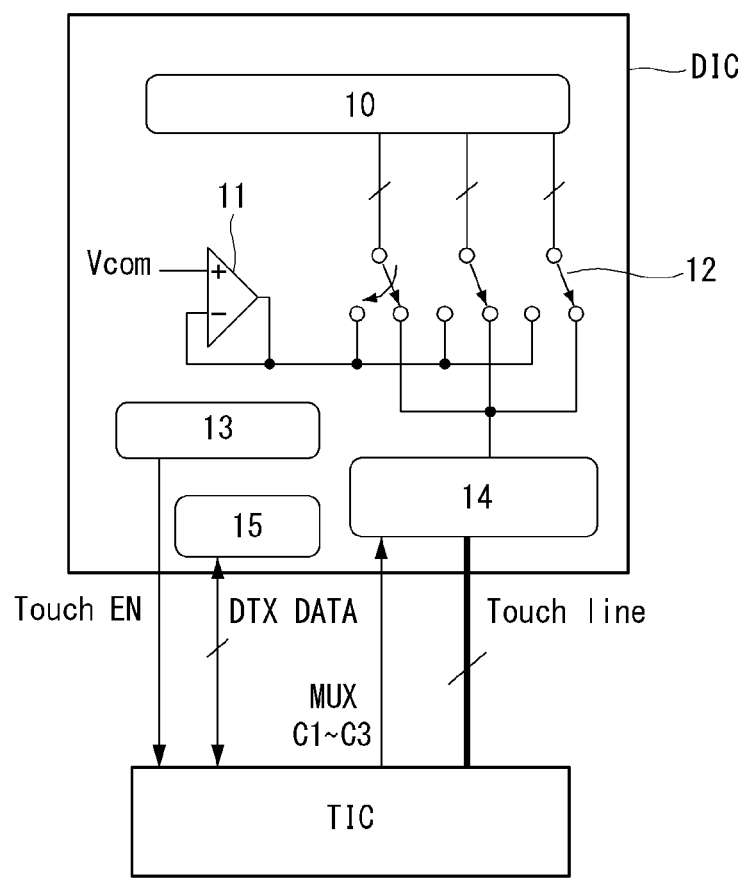
FIGS. 9, 10, and 11 are diagrams illustrating a driving device according to an embodiment of the present invention.
Figure 10:
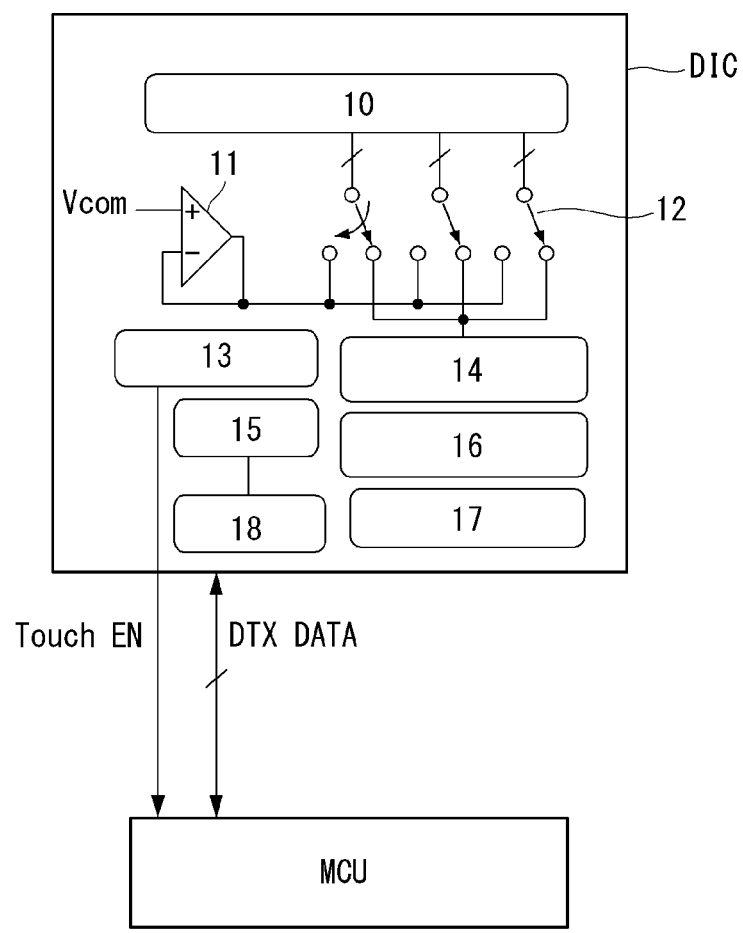
Figure 11:
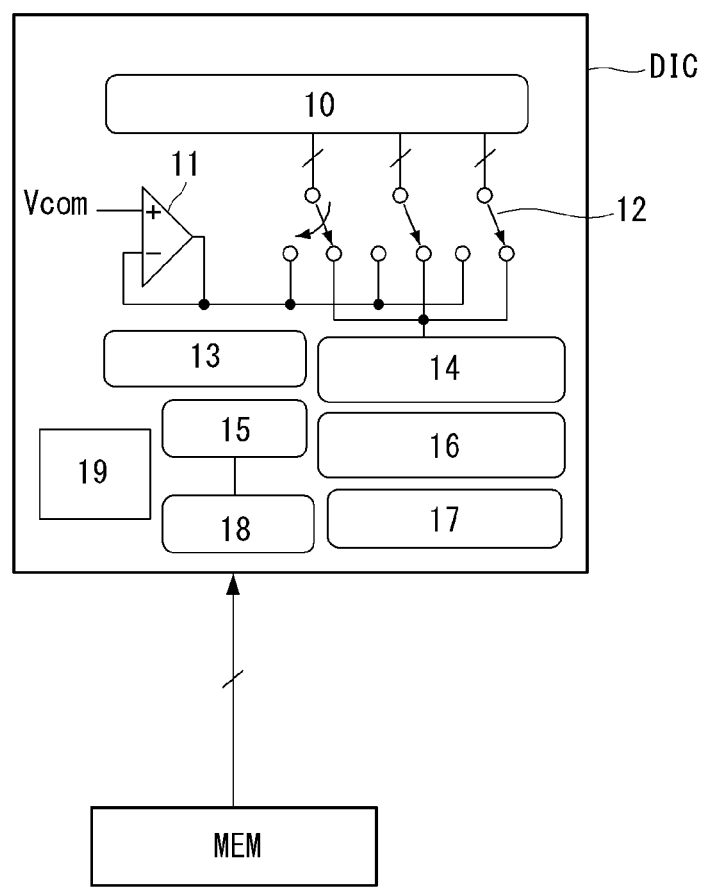

A driving device of the present invention may be implemented with an Integrated Circuit (IC) package of the same form as that of FIGS. 9 to 11.

Referring to FIG. 9, the driving device includes a drive IC (DIC) and a touch IC (TIC).

The DIC includes a touch sensor channel unit 10, a Vcom buffer 11, a switch array 12, a timing control signal generator 13, a Multiplexer (MUX) 14, and a DTX compensation unit 15.

The touch sensor channel unit 10 is connected to a pattern electrode 120 of touch sensors through a sensing line (SL) and is connected to the Vcom buffer 11 and the multiplexer 14 through the switch array 12. The multiplexer 14 connects the SL to the TIC. In a 1:3 multiplexer, the multiplexer 14 time-division connects one channel of the TIC to three sensing lines SL, thereby reducing the channel number of the TIC. The multiplexer 14 selects sensing lines to be connected to a channel of the TIC in response to MUX control signals (MUX C1-C3). The multiplexer 14 is connected to channels of the TIC through touch lines.

The Vcom buffer 11 outputs a common voltage Vcom of a pixel. The switch array 12 supplies a common voltage Vcom from the Vcom buffer 11 to the touch sensor channel unit 10 for a display time under the control of the timing control signal generator 13. The switch array 12 connects the SL to the TIC for a touch time under the control of the timing control signal generator 13.

Figure 15:
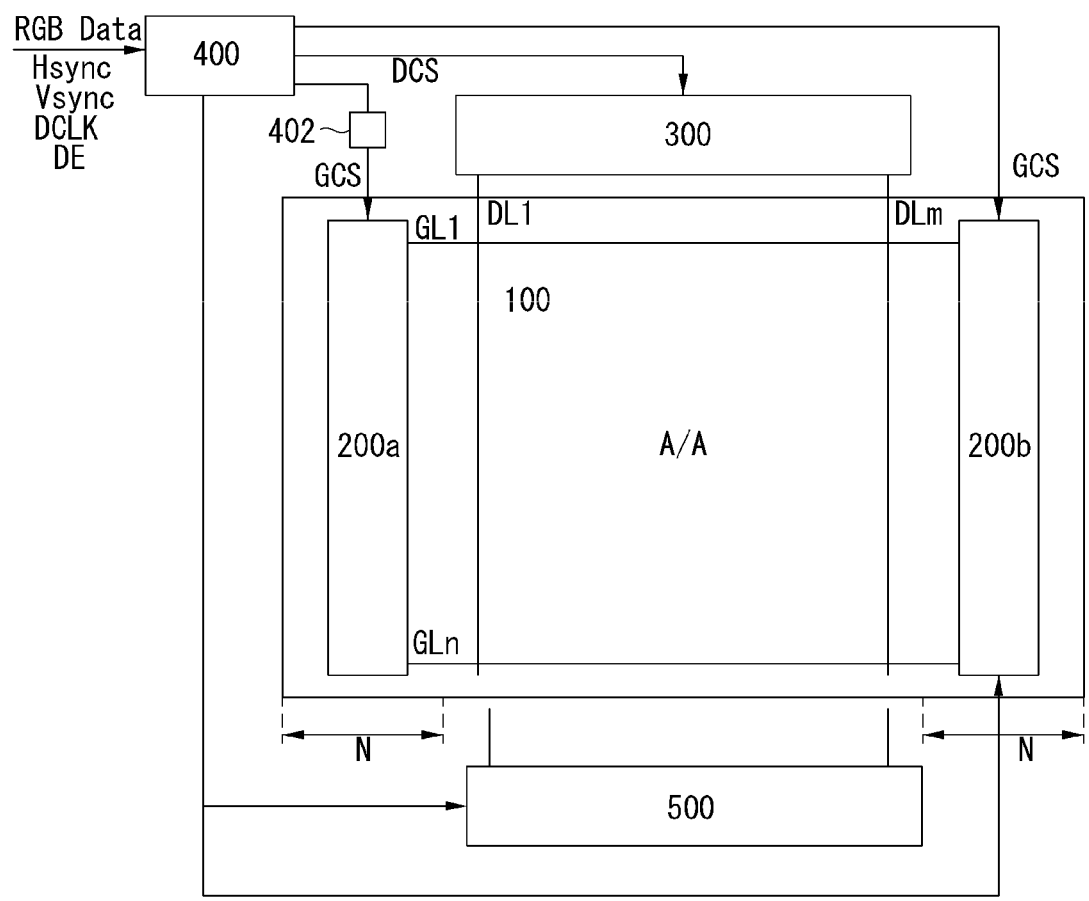
FIG. 15 is a diagram illustrating a touchscreen integrated display device including two gate driver circuits and a driving unit thereof according to an embodiment.

The timing control signal generator 13 generates timing control signals for controlling operation timing of the display driver circuit and the TIC. The display driver circuit includes a data driver circuit and a gate driver circuit for writing data of an input image in a pixel. The data driver circuit generates a data voltage to supply the data voltage to data lines of the display panel. The data driver circuit may be integrated in the DIC. The gate driver circuit sequentially supplies gate pulses (or scan pulses) synchronized with a data voltage to gate lines of the display panel. The gate driver circuit may be together disposed on a substrate of the display panel together with pixels, as shown in FIGS. 12 and 15.

Figure 12:
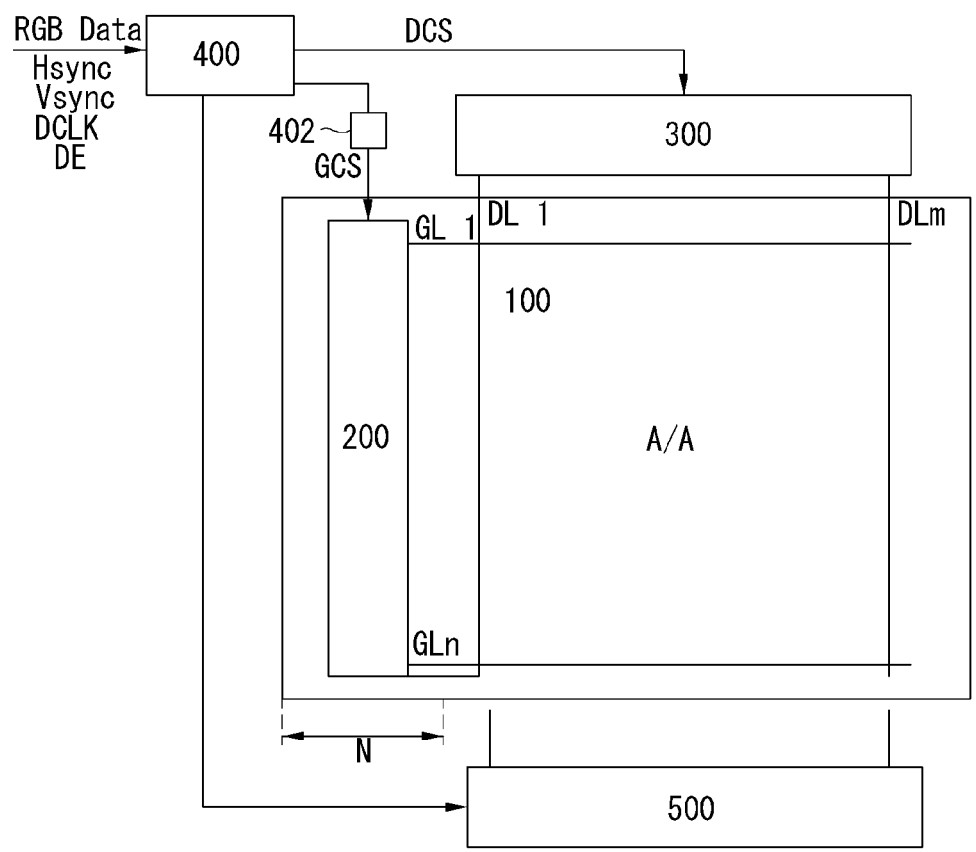
FIG. 12 is a diagram illustrating a touchscreen integrated display device including a single gate driver circuit and a driving unit thereof according to an embodiment.

The timing control signal generator 13 is substantially the same as a timing control signal generator within a timing controller 400 of FIG. 12. The timing control signal generator 13 drives a display driver circuit for a display time and drives a TIC for a touch time.

The timing control signal generator 13 generates a touch enable signal (Touch EN) that defines a display time and a touch time to synchronize a display driver circuit and a TIC. The display driver circuit writes data in pixels for a first level period of the Touch EN. The TIC drives touch sensors and senses a touch input in response to a second level of the Touch EN. A first level of the Touch EN may be a low level, and a second level thereof may be a high level, but the first level and the second level of the Touch EN may be set to the contrary.

The VTEN that suppresses discharge of a Q node of the gate driver circuit is generated based on a Touch EN of a digital logic level generated by the timing control signal generator 13. The timing control signal generator 13 modulates a Touch EN by further extending by a width within 1 clock pulse width at the front and the rear of a second level time of the Touch EN to define timing of the VTEN of FIG. 6 or to define timing of the VTEN of FIG. 8 using the Touch EN. Because a level shifter (not shown) cannot control a MOSFET of a gate driver circuit with a Touch EN of a digital logic level output from the timing control signal generator 13, the level shifter shifts a level of the Touch EN to generate a VTEN that swings between a VGH and a VGL. The level shifter shifts levels of a gate start pulse VST of a digital logic level output from the timing control signal generator 13 and a gate shift clock CLK to a VGH and VGL. The VTEN, the gate start pulse VST, and the gate shift clock CLK from the level shifter are supplied to the shift register of the gate driver circuit.

Noise may increase in a touch sensor signal according to a change of input image data. The DTX compensation unit 15 analyzes input image data and removes a noise component from touch raw data (TDATA) and transmits the TDATA to a TIC according to a gray scale change of an input image. DTX means Display and Touch crosstalk. In a system in which noise of the touch sensor does not sensitively change according to a data change of an input image, because a DTX compensation unit 15 is unnecessary, the DTX compensation unit 15 may be omitted. In FIG. 9, DTX DATA is output data of the DTX compensation unit 15.

By driving the multiplexer 14 for a touch time in response to a Touch EN from the timing control signal generator 13, the TIC receives electric charges of a touch sensor through the multiplexer 14 and sensing lines SL. In FIG. 9, MUX C1-C3 are a signal that selects a channel of a multiplexer.

The TIC detects an electric charge change amount before and after a touch input from a receiving signal of the touch sensor, compares the electric charge change amount with a predetermined threshold value, and determines a location of touch sensors having an electric charge change amount of a threshold value or more to a touch input area. The TIC calculates a coordinate of each of touch inputs and transmits touch data including touch input coordinate information to an external host system. The TIC includes an amplifier that amplifies electric charges of the touch sensor, an integrator that accumulates electric charges received from the touch sensor, an Analog to Digital Converter (ADC) that converts a voltage of the integrator to digital data, and an operation logic unit. The operation logic unit executes touch recognition algorithm that compares TDATA output from the ADC with a threshold value and that determines a touch input according to a comparison result thereof and that calculates a coordinate.

The DIC and the TIC may transmit and receive signals through a Serial Peripheral Interface (SPI).

A host system indicates a system body of an electronic device to which a display device of the present invention can be applied. The host system may be any one of a phone system, a television (TV) system, a set-top box, a navigation system, a digital versatile disk (DVD) player, a Blueray player, a personal computer (PC), and a home theater system. The host system transmits data of an input image to the DIC and receives touch input data from the TIC to execute an application related to a touch input.

Referring to FIG. 10, a driving device includes a drive IC (DIC) and a Micro Controller Unit (MCU).

The DIC includes a touch sensor channel unit 10, a Vcom buffer 11, a switch array 12, a first timing control signal generator 13, a multiplexer 14, a DTX compensation unit 15, a sensing unit 16, a second timing control signal generator 17, and a memory 18. The present embodiment has a difference in that the sensing unit 16 and the second timing control generator 17 are integrated within the DIC, compared with the foregoing embodiment of FIG. 9. The first timing control generator 17 is substantially the same as that of FIG. 9. Therefore, the first timing control generator 17 generates timing control signals for controlling operation timing of a display driver circuit and a TIC.

The sensing unit 16 includes an amplifier that amplifies electric charges of a touch sensor, an integrator that accumulates electric charges received from the touch sensor, and an ADC that converts a voltage of the integrator to digital data. TDATA output from the ADC is transmitted to the MCU. The second timing control generator 17 generates a timing control signal and a clock for controlling operation timing of the multiplexer 14 and the sensing unit 16. The DTX compensation unit 15 may be omitted within the DIC. The memory 18 temporarily stores TDATA under the control of the second timing control generator 17.

The DIC and the MCU may transmit and receive signals through a Serial Peripheral Interface (SPI). The MCU executes touch recognition algorithm that compares TDATA with a threshold value and that determines a touch input according to a comparison result thereof and that calculates a coordinate.

Referring to FIG. 11, the driving device includes a drive IC (DIC) and a memory (MEM).

The DIC includes a touch sensor channel unit 10, a Vcom buffer 11, a switch array 12, a first timing control signal generator 13, a multiplexer 14, a DTX compensation unit 15, a sensing unit 16, a second timing control signal generator 17, a memory 18, and a MCU 19. The present embodiment has a difference in that the MCU 19 is integrated within the DIC, compared with the foregoing embodiment of FIG. 10. The MCU 19 executes touch recognition algorithm that compares TDATA with a threshold value and that determines a touch input according to a comparison result thereof and that calculates a coordinate.

The memory MEM stores a register setting value about timing information necessary for operation of the display driver circuit and the sensing unit 16. When power of the display device is turned on, a register setting value from the memory MEM is loaded to the first timing control signal generator 13 and the second timing control signal generator 17. The first timing control signal generator 13 and the second timing control signal generator 17 generate timing control signals for controlling the display driver circuit and the sensing unit 16 based on the register setting value read from the memory. By changing a register setting value of the memory MEM without structural change of the driving device, the driving device may correspond to a model change.

Figure 13:
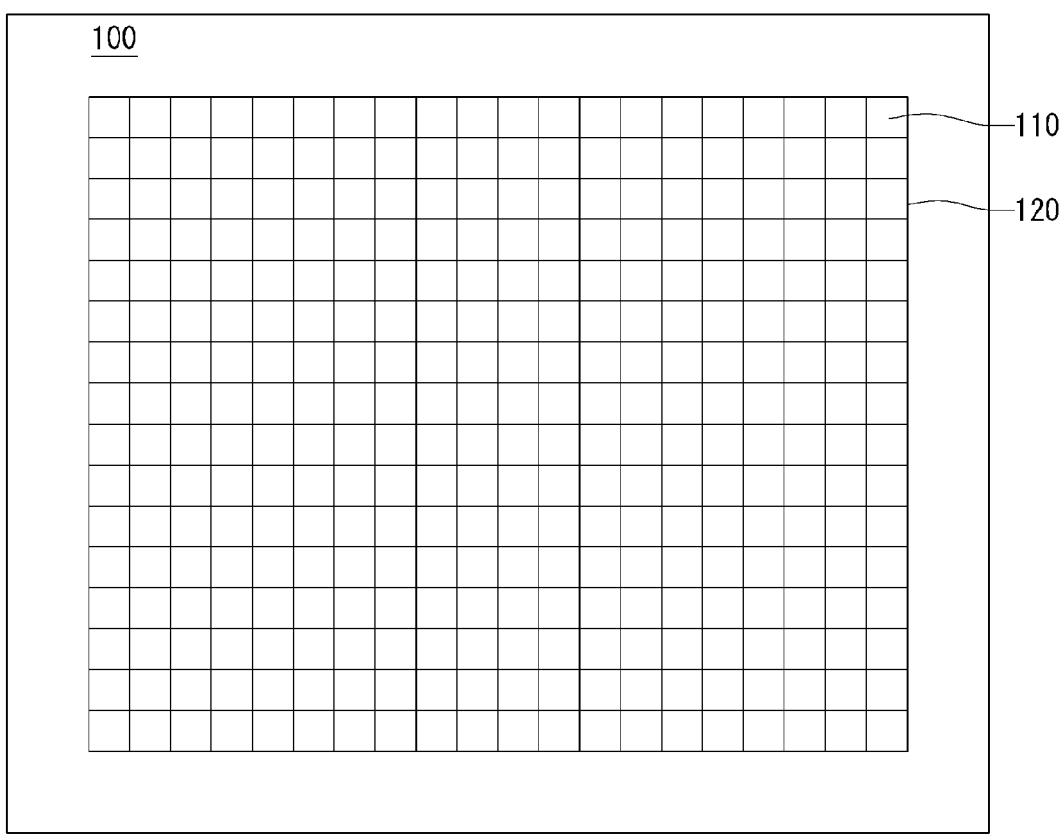
FIG. 13 is a diagram illustrating a plurality of pixels of a display panel and pattern electrodes corresponding thereto.
Figure 14:
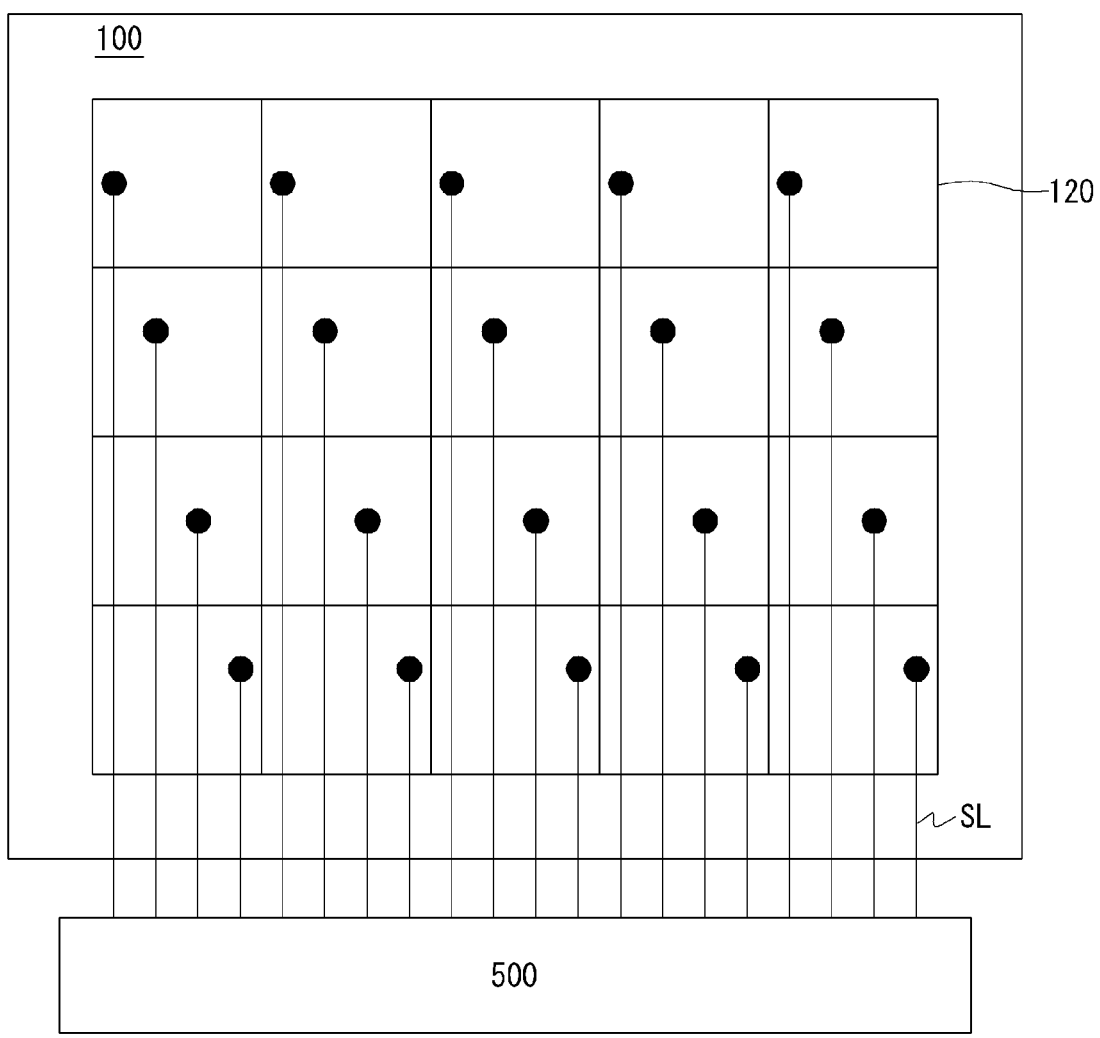
FIG. 14 is a diagram illustrating connection of pattern electrodes and sensing lines.

FIG. 12 is a diagram illustrating a touchscreen integrated display device including a single gate driver circuit and a driving unit thereof according to an embodiment, FIG. 13 is a diagram illustrating a plurality of pixels of a display panel and pattern electrodes corresponding thereto and FIG. 14 is a diagram illustrating connection of pattern electrodes and sensing lines. FIG. 15 is a diagram illustrating a touchscreen integrated display device including two gate driver circuits and a driving unit thereof according to an embodiment.

As shown, the display device of the present invention includes a display panel 100 for displaying images, a timing controller 400 for receiving timing signals from a host system and generating various control signals, a gate driver circuit 200 and a data driver circuit 300 for controlling the display panel 100 in response to the control signals, and a touch driver circuit 500 for touch operation.

The display panel 100 includes K (K being a natural number) gate lines GL and a plurality of data lines DL, formed in a matrix form on a glass substrate in an intersecting manner, and a plurality of pixels 110 formed at intersections of the gate lines and the data lines. Each pixel 110 includes a thin film transistor (TFT), a liquid crystal capacitor C1c and a storage capacitor Cst. All pixels 110 form one display area A/A. An area in which the pixels 110 are not present is defined as a non-display area N.

In addition, the display panel 100 includes a touchscreen embedded therein. The touchscreen senses a touch point of a user. Particularly, the display panel according to the present invention may include a self-capacitance in-cell type touchscreen. In addition, the pixels 110 of the display panel 100 may be grouped into a plurality of pixel groups, and the display panel 100 may further include a plurality of pattern electrodes 120 with one-to-one correspondence to the pixel groups, as shown in FIG. 13. The pattern electrodes 120 may be connected to the touch driver circuit 500 through sensing lines SL, as shown in FIG. 14.

The pattern electrodes 120 may be provided with a common voltage for driving display of the display panel 100 so as to operate as common electrodes that drives liquid crystal along with pixel electrodes. In addition, the pattern electrodes 120 may be provided with a touch scan signal for sensing touch so as to operate as touch electrodes for sensing touch points. For example, the touchscreen integrated display device according to an embodiment of the present invention performs display operation and touch operation in a time division manner within one frame. That is, the pattern electrodes 120 operate as common electrodes for driving the display with the pixel electrodes by being provided with a common voltage when the display panel 100 is in a display mode and operate as touch electrodes for sensing a touch point by being provided with a touch screen signal from the touch driver circuit 500 when the display panel 100 is in a touch mode. Here, the common voltage may be applied by the touch driver circuit 500 or may be directly supplied from an additional common voltage generator, which may be included in the display device, to the display panel 100 without passing through the touch driver circuit 500.

The touch driver circuit 500 may include a touch scan signal generator for generating the touch scan signal, a touch sensor for sensing touch using a difference between received touch sensing signals and a switch through which the common voltage or the touch scan signal is applied to the plurality of electrodes. The touch driver circuit 500 applies the common voltage or the touch scan signal to the pattern electrodes 120 through the sensing lines SL according to the driving mode of the display panel 100, receives touch sensing signals, generated according to the touch scan signal, from the pattern electrodes 120 and senses presence or absence of touch using a difference between the received touch sensing signals.

The pattern electrodes 120 may be grouped and sequentially operate for one frame on a group basis. The number of pattern electrodes 120 per group may be changed on the basis of a touch time and a display time.

The timing controller 400 transmits an input video signal (RGB) received from a host system to the data driver circuit 200. The timing controller 400 generates a timing control signal for controlling operation timing of the gate driver circuit 200 and the data driver circuit 300 using timing signals such as a clock signal (DCLK), a horizontal synchronization signal (Hsync), a vertical synchronization signal (Vsync), and a data enable signal (ED) received together with the RGB.

Here, the Hsync is a signal indicating a time taken to display one horizontal line of a picture, the Vsync is a signal indicating a time taken to display an image corresponding to one frame, and the DE is a signal indicating a period in which a data voltage is supplied to the pixels of the display panel 100.

Furthermore, the timing controller 400 generates a control signal GCS of the gate driver circuit 200 and a control signal DCS of the data driver circuit 300 in synchronization with the timing signals input thereto.

In addition, the timing controller 400 generates a plurality of clock signals for determining driving timing of each stage of the gate driver circuit 200 and provides the driving timing to the gate driver circuit 200. The timing controller 400 arranges and modulates video data RGB input thereto into a form that can be processed by the data driver circuit 300 and outputs the modulated video data. The arranged video data may have a form to which a color coordinate correction algorithm has been applied.

The timing controller 400 generates a Touch EN for touch operation. The Touch EN is provided to the touch driver circuit 500. The Touch EN is supplied to the gate driver circuit 200 through a level shifter 402. The touch driver circuit 500 is driven while a high-level Touch EN is supplied to sense a touch input.

The data driver circuit 300 generates a sampling signal by shifting a source start pulse (SSP) signal supplied from the timing controller 400 according to a source shift clock (SSC) signal. In addition, the data driver circuit 300 latches video data, input thereto in response to the SSC clock signal, according to the sampling signal so as to change the video data into a data signal and then supplies the data signal to the data lines DL on a horizontal line basis in response to a source output enable (SOE) signal. To this end, the data driver circuit 300 may include a data sampling unit, a latch unit, a digital-to-analog converter, an output buffer and the like.

The gate driver circuit 200 shifts a gate start pulse (GSP) signal transmitted from the timing controller 400 according to a gate shift clock (GSC) and sequentially supplies a gate pulse signal of a VGH level to the gate lines GL1 to GLn. The gate driver circuit 200 supplies a gate low voltage VGL to the gate lines GL1 to GLn in a period in which the gate pulse signal is not supplied.

While the gate driver circuit 200 applied to the present invention may be configured independently of the panel and electrically connected to the panel in various manners, the gate driver circuit 200 can be configured in the form of a thin film pattern in the non-display area N through a gate-in panel (GIP) method during manufacture of the substrate of the display panel 100. In this case, a clock signal CLK and a start signal VST for driving a first operating stage of a shift register can be gate control signals for controlling the gate driver circuit 200.

Referring to FIG. 15, two gate driver circuits 200a and 200b may be provided to non-display areas N at both sides of the display panel 100. The first and second gate driver circuits 200a and 200b are composed of a plurality of stages constituting a shift registers. The first and second gate driver circuits 200a and 200b may alternately output gate pulses through the gate lines GL1 to GLn formed in the display panel 100 in response to the gate control signal GCS supplied from the timing controller 400. Here, the output gate pulses may overlap for a predetermined horizontal period for precharging of the gate lines GL1 to GLn so as to enable more stable pixel charging when a data voltage is applied.

Figure 16A:
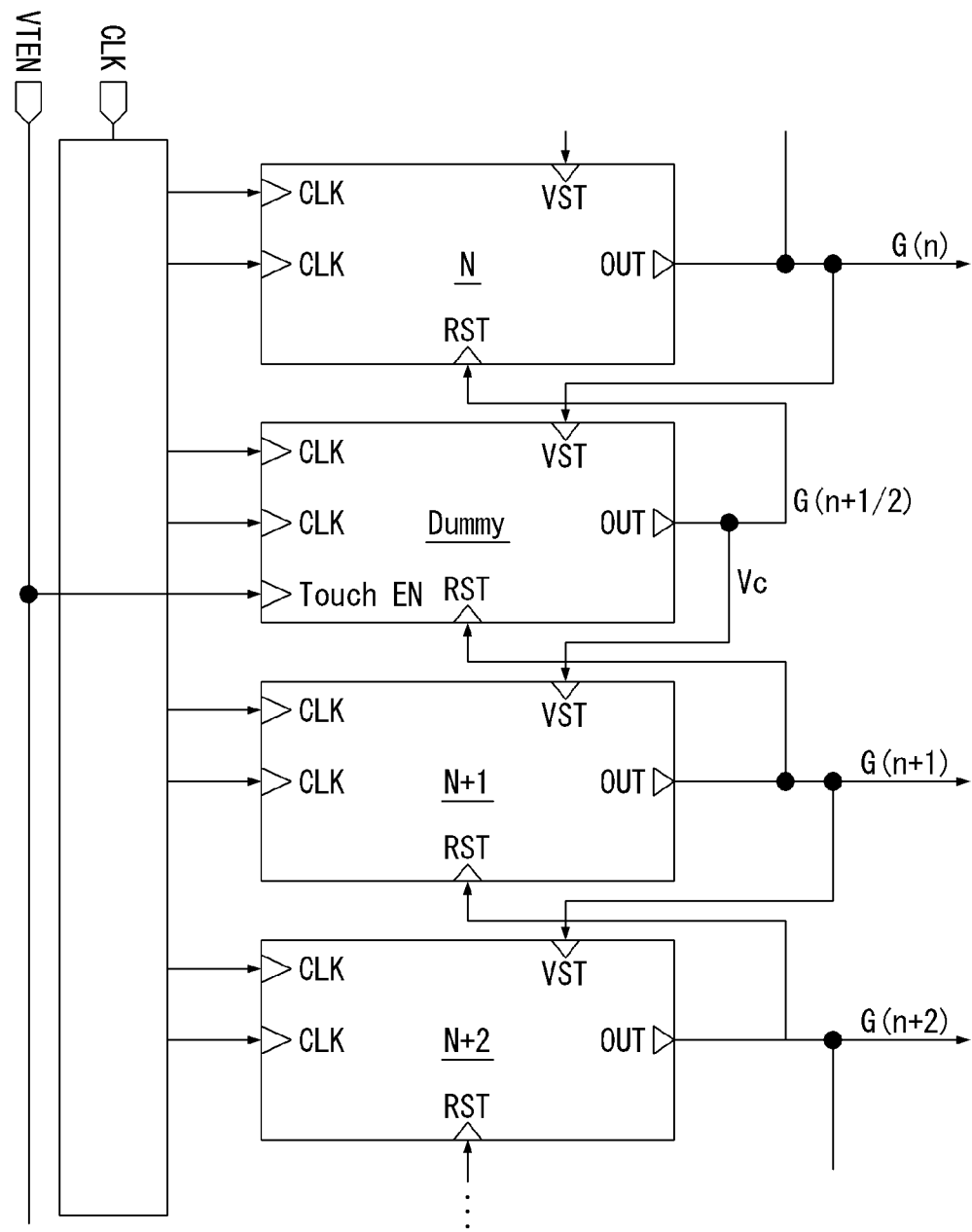
FIG. 16A is a diagram illustrating connection of a plurality of stages constituting a shift register according to a first embodiment.
Figure 16B:
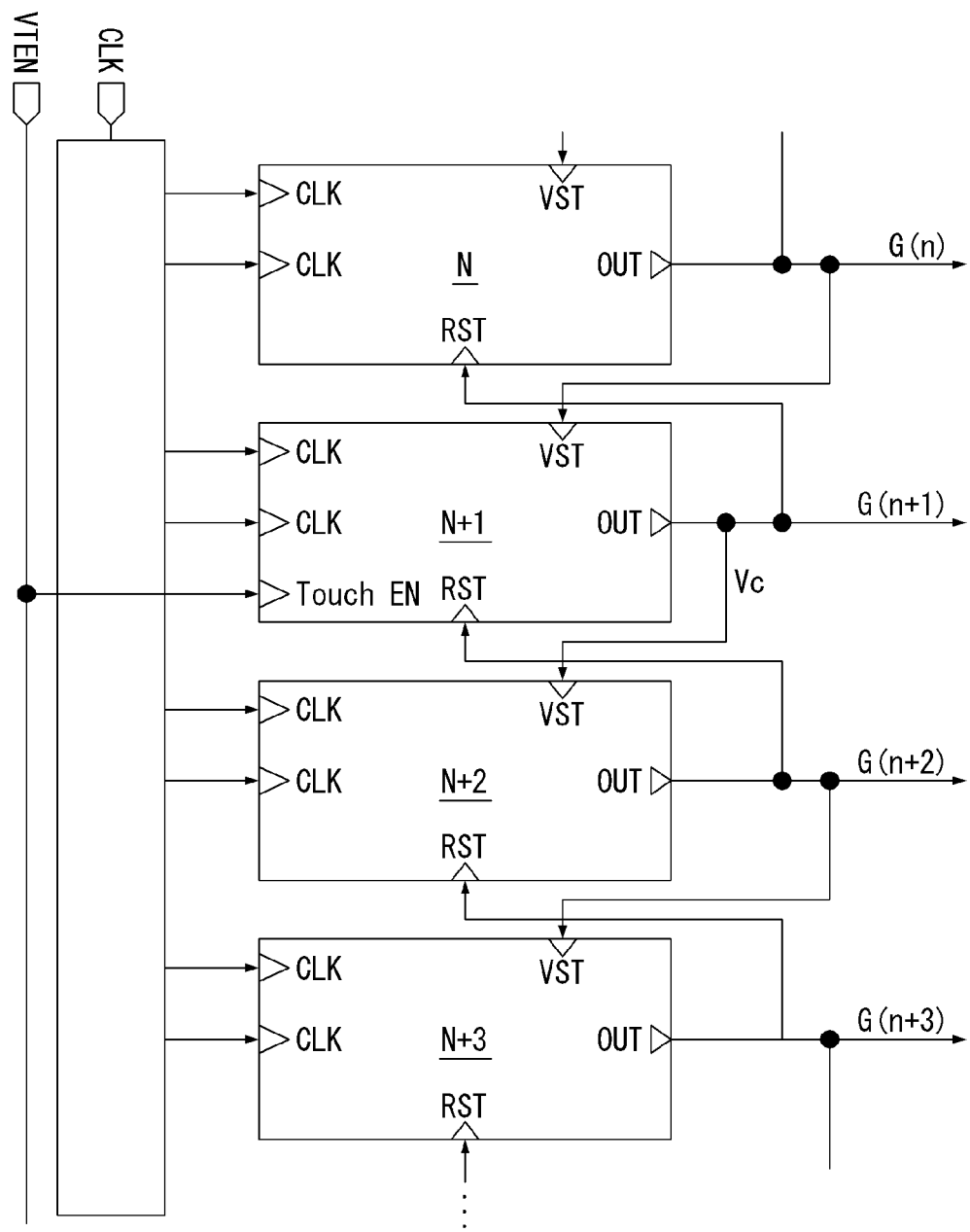
FIG. 16B is a diagram illustrating connection of a plurality of stages constituting a shift register according to a second embodiment.
Figure 17A:
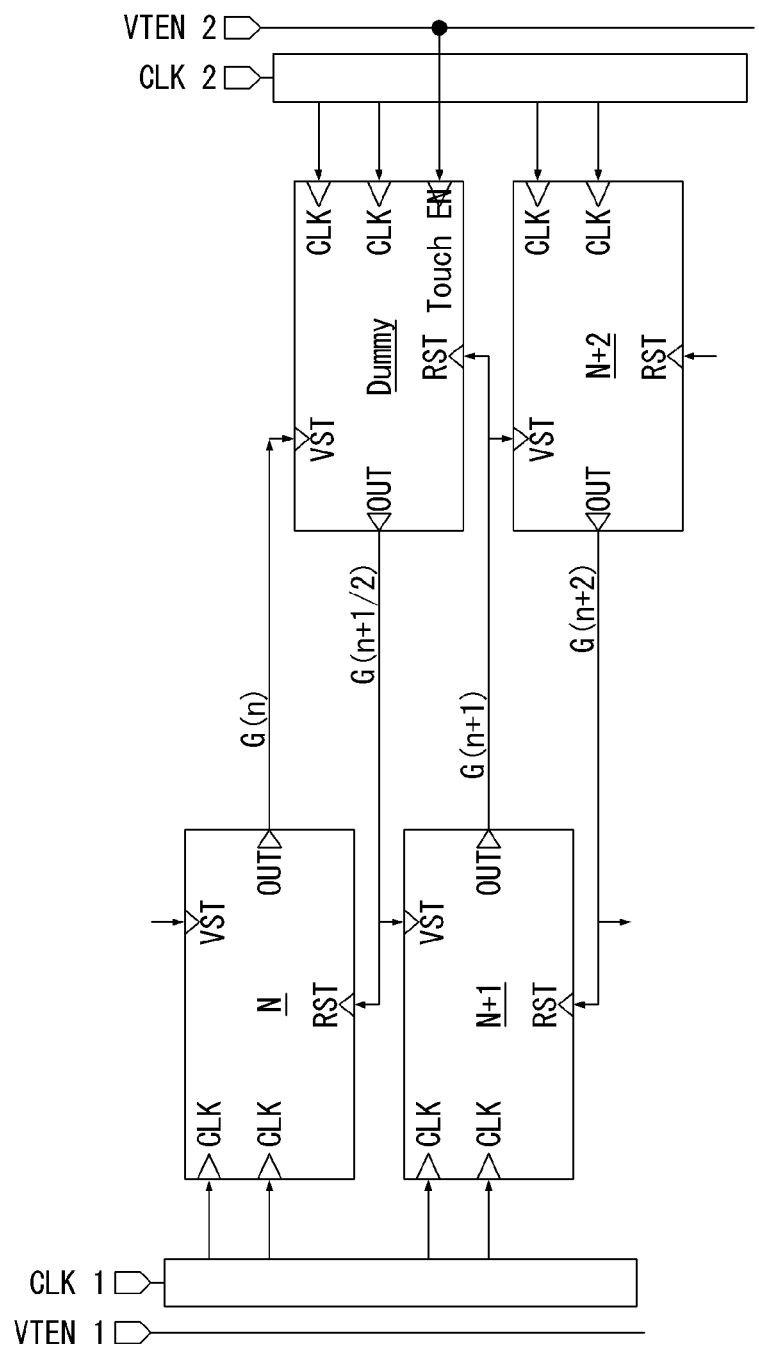
FIG. 17A is a diagram illustrating connection of a plurality of stages constituting a shift register according to a third embodiment.

FIGS. 16A, 16B, 17A, and 17B illustrate connection of a plurality of stages constituting a shift register according to different embodiments of the present invention. FIG. 18A illustrates forward and reverse gate scanning of the plurality of stages constituting the shift register shown in FIGS. 16A and 17A, and FIG. 18B illustrates forward and reverse gate scanning of the plurality of stages constituting the shift register shown in FIGS. 16B and 17B. FIG. 19 is a time flow diagram showing time-division display and touch driving operation.

As shown in FIG. 18A, the stages are driven in the order of B, C (dummy stage) and A during forward driving operation and in the order of A, C (dummy stage) and B during reverse driving operation. In forward driving operation, B is a stage outputting the last gate pulse prior to touch operation, C is a dummy stage which holds charging state of a Q node thereof during a touch time, and A is a stage outputting the first gate pulse after completion of the touch operation. In reverse driving operation, A is a stage outputting the last gate pulse prior to the touch operation, C is a dummy stage which holds charging state of a Q node thereof during the touch time, and B is a stage outputting the first gate pulse after completion of the touch operation.

As shown in FIG. 18B, the stages are driven in the order of B and A during forward driving operation and in the order of A and B during reverse driving operation. In forward driving operation, B is a stage outputting the last gate pulse prior to the touch operation and A is a stage which holds charging state of a Q node thereof during the touch time and outputs the first gate pulse after completion of the touch operation. In reverse driving operation, A is a stage outputting the last gate pulse prior to the touch operation and B is a holding stage which holds charging state of a Q node thereof during the touch operation and outputs the first gate pulse after completion of the touch operation.

Figure 18C:
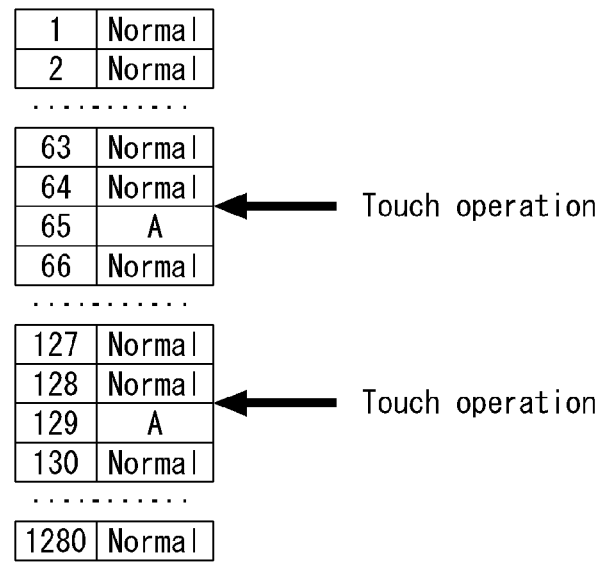
FIG. 18C is a diagram illustrating an example in which no dummy stage exists in a single direction (forward direction).
Figure 19:
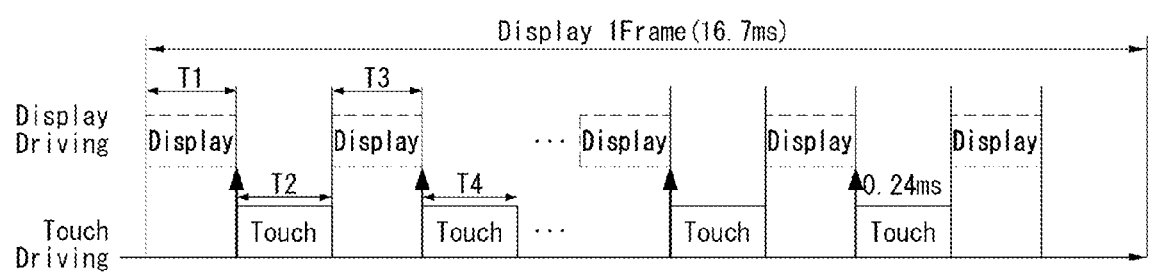
FIG. 19 is a time flow diagram showing time division display and touch driving operation.

FIG. 18C illustrates an example in which no dummy stage exists in a single direction. A is a holding stage in which a Q node holds a charged state during touch driving and is a stage that outputs a first gate pulse after touch driving is terminated.

Figure 18D:
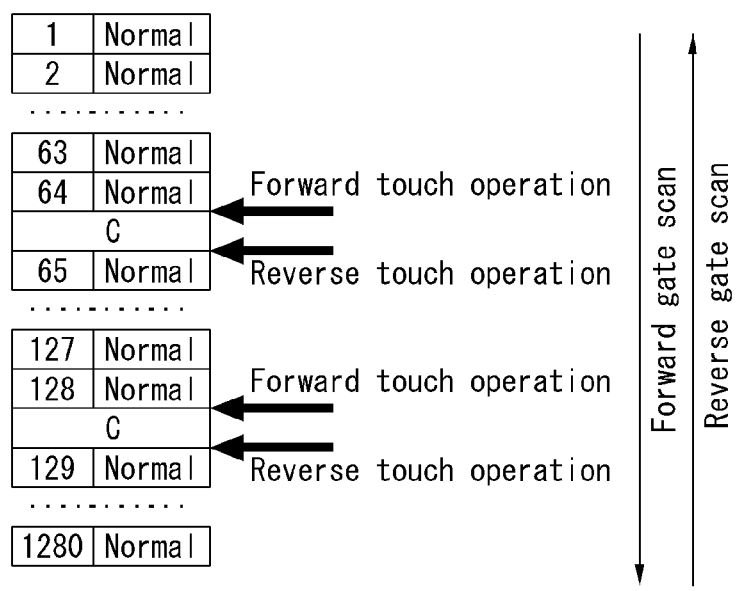
FIG. 18D is a diagram illustrating an example in which a dummy stage is added in the shift register that can be driven in a both direction.

FIG. 18D illustrates an example in which a dummy stage C is added when a gate can be driven in a both direction (forward direction, reverse direction).

For convenience, the following description is described based on connection of an N-th (N is a natural number) stage from among the plurality of stages and output of a gate pulse signal of a VGH level from the N-th stage to a corresponding gate line.

<First and Third Shift Registers>

Figure 17B:
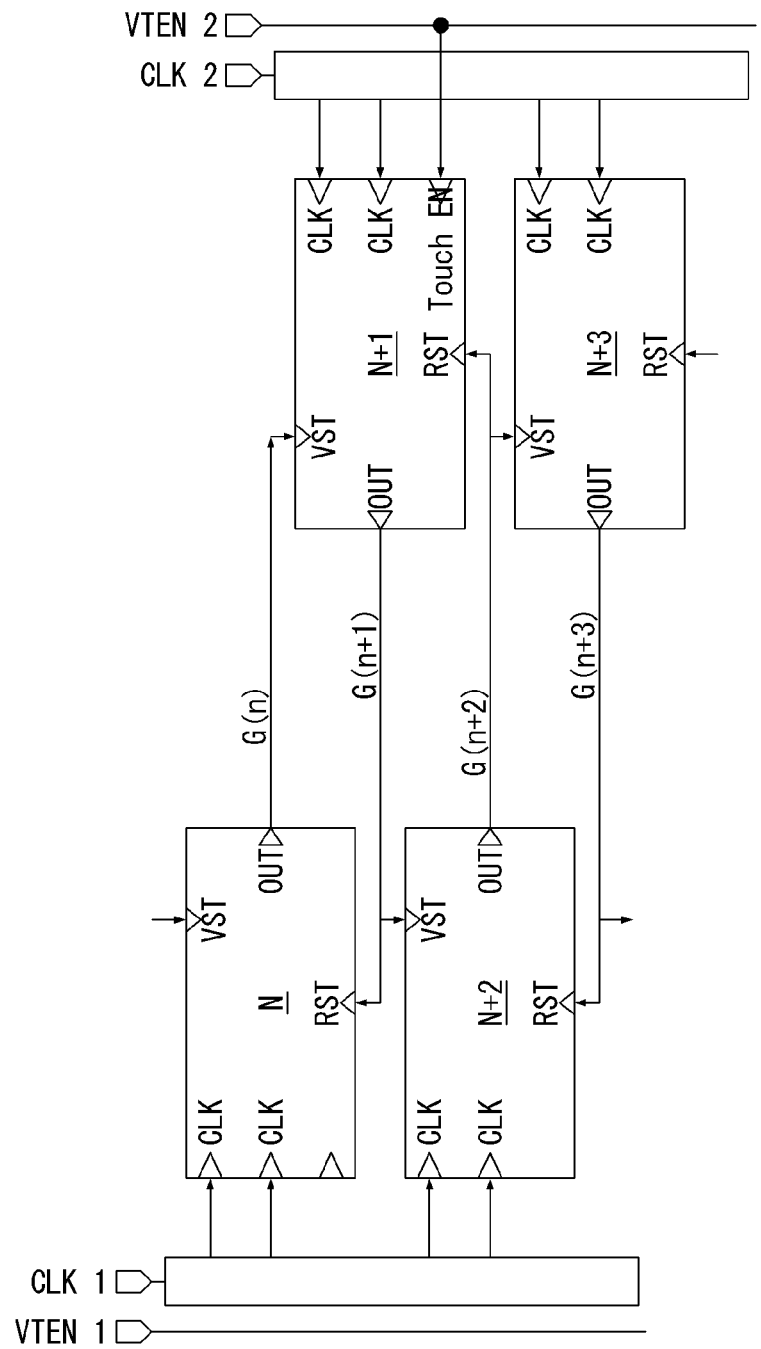
FIG. 17B is a diagram illustrating connection of a plurality of stages constituting a shift register according to a fourth embodiment.

Referring to FIGS. 16A and 16B, a shift register 210 according to first and second embodiments is a shift register included in the gate driver circuit 200 according to the first embodiment, shown in FIG. 1. Referring to FIGS. 17A and 17B, a shift register 210 according to third and fourth embodiments is a shift register included in the gate driver circuits 200a and 200b according to the second embodiment, shown in FIG. 15.

FIGS. 16A and 17A show N-th, (N+1) th and (N+2) th stages and a dummy stage as a plurality of stages constituting the shift register according to the first and third embodiments. Each of the N-th, (N+1) th, and (N+2) th stages can be provided with at least two clock signals through a clock signal line CLK (first and second clock signal lines CLK 1 and CLK2 in the case of the shift register included in the gate driver circuits 200a and 200b according to the second embodiment), receive one of output signals of neighboring stages as a start signal and receive the other output signal of neighboring stages as a reset signal.

The dummy stage may receive at least two clock signals from the clock signal line CLK, receive a Touch EN (VTEN, VTEN1, VTEN2) from a touch enable signal line, receive one of output signals of neighboring stages as a start signal VST and receive the other as a reset signal RST.

The stages may perform operation for supplying a gate pulse signal upon reception of the start signal VST and perform operation for discharging gate lines GL upon reception of the reset signal RST.

Specifically, the N-th stage includes a start signal VST input terminal and a reset signal RST input terminal, receives a gate pulse output from an output terminal G (n−1) of the (N−1) th stage, which is the previous stage, through the VST input terminal, and receives a carry signal Vc output from an output terminal G (n+½) of the dummy stage, which is the next stage, through the RST input terminal.

The dummy stage includes a start signal VST input terminal and a reset signal RST input terminal, receives gate pulses output from an output terminal G (n) of the N-th stage, which is the previous stage, through the VST input terminal, and receives a scan signal output from an output terminal G (n+1) of the (N+1) th stage, which is the next stage, through the RST input terminal.

Particularly, the dummy stage may hold a voltage charged at a Q node while preventing leakage current using a touch enable signal (TEN) of a VGH level during a touch time and output the carry signal Vc to the next stage, (N+1) th stage, through the output terminal G (n+½) in response to a clock signal of a VGH level applied thereto at the end of the touch time.

The (N+1) th stage includes a start signal VST input terminal and a reset signal RST input terminal, receives the carry signal Vc output from the output terminal G (n+1/2) of the dummy stage, which is the previous stage, through the VST input terminal, and receives a scan signal output from an output terminal G (n+2) of the (N+2) th stage, which is the next stage, through the RST input terminal.

The (N+2) th stage includes a start signal VST input terminal and a reset signal RST input terminal, receives gate pulses output from the output terminal G (n+1) of the (N+1) th stage, which is the previous stage, through the VST input terminal, and receives a scan signal output from an output terminal G (n+3) of the (N+3) th stage, which is the next stage, through the RST input terminal.

As described above, the shift register according to the embodiment of the present invention can include a plurality of dummy stages. For example, as shown in FIG. 18A, the shift register can include a single dummy stage arranged between first to sixty-fourth stages for sequentially supplying gate pulses to first to sixty-fourth gate lines G1 to GL64 and sixty-fifth to one-hundred-twenty-eighth stages for sequentially supplying gate pulses to one-hundred-twenty-eighth gate lines GL65 to GL 128. While the number of gate lines GL per group is 64, the present invention is not limited thereto and stages corresponding to gate lines to be activated for one display time from among a plurality of display times within one frame may be grouped and a dummy stage may be arranged between groups, as shown in FIG. 19.

While the above description is described based on forward operation performed from the first stage to the last stage, the present invention is not limited thereto and is applicable to reverse operation performed from the last stage to the first stage, for example, a case in which gate pulse output of the (N+1) th stage is followed by operation of the dummy stage and then the N-th stage operates.

Each of the plurality of stages may output a gate pulse signal to one of the plurality of gate lines G1 to GLn in synchronization with one clock signal CLK.

In addition, all stages may be provided with a high source voltage VDD from a high voltage source, a VGL from a low voltage source, a forward voltage FWD and a reverse voltage REV and all dummy stages each may be provided with the touch enable signal. The forward voltage FWD is generated in a VGH level in a forward scan mode and is generated in a VGL level in a reverse scan mode. In contrast, the reverse voltage REV is generated in a VGH level in a reverse scan mode and is generated in a VGL level in a forward scan mode.

<Second and Fourth Shift Registers>

FIGS. 16B and 17B show N-th, (N+1) th, (N+2) th, and (N+3) th stages as a plurality of stages constituting the shift register according to the second and fourth embodiments.

The N-th, (N+1) th, (N+2) th, and (N+3) th stages may be provided with at least two clock signals through the clock signal line CLK (the first and second clock signal lines CLK1 and CLK2 in the case of the second embodiment including the first and second gate driver circuits 200*a* and 200*b*). The first and second clock signals may have opposite logic levels. Each stage can receive one of output signals of neighboring stages as the start signal VST and receive the other of output signals of neighboring stages as the reset signal RST.

Part of the plurality of stages functions as a standby stage which needs to hold a Q node voltage for the touch time. Such standby stage may receive at least two clock signals through the clock signal line CLK, receive the Touch EN (VTEN, VTEN1, VTEN2) through the touch enable signal line, receive one of output signals of neighboring stages as the start signal VST and receive the other of output signals of neighboring stages as the reset signal RST.

The aforementioned stages may perform operation of supplying the gate pulse signal upon reception of the start signal VST and perform operation of discharging corresponding gate lines upon reception of the reset signal RST.

Specifically, the N-th stage includes a start signal VST input terminal and a reset signal RST input terminal, receives a gate pulse signal output from an output terminal G (n−1) of the (N−1) th stage, which is the previous stage, through the VST input terminal, and receives a gate pulse signal output from an output terminal G (n+1) of the (N+1)-stage, which is the next stage, through the RST input terminal.

The (N+1) th stage includes a start signal VST input terminal and a reset signal RST input terminal, receives a gate pulse signal output from an output terminal G (n) of the N-th stage, which is the previous stage, through the VST input terminal, and receives a scan signal output from an output terminal G (n+2) of the (N+2) th stage, which is the next stage, through the RST input terminal.

The (N+2) th stage includes a start signal VST input terminal and a reset signal RST input terminal, receives a gate pulse signal output from the output terminal G (n+1) of the (N+1) th stage, which is the previous stage, through the VST input terminal, and receives a scan signal output from an output terminal G (n+3) of the (N+3) th stage, which is the next stage, through the RST input terminal.

Particularly, the (N+1) th stage set to a standby stage from among the plurality of stages can hold the voltage of the Q node thereof while preventing leakage current using a touch enable signal (VTEN) of a VGH level during the touch time and output the gate pulse signal to the next stage, (N+2) th stage, through the output terminal G (n+1) in response to a clock signal of a VGH level applied thereto at the end of the touch time.

As described above, the shift register 210 according to the embodiment of the present invention may include a plurality of standby stages. For example, as shown in FIG. 18B, the shift register can have the sixty-fifth stage as a standby stage from among first to sixty-fourth stages for sequentially supplying a gate pulse signal to first to sixty-fourth gate lines G1 to GL64 and sixty-fifth to one-hundred-twenty-eighth stages for sequentially supplying the gate pulse signal to one-hundred-twenty-eighth gate lines GL65 to GL 128. While the number of gate lines GL per group is 64, the present invention is not limited thereto and the number of gate lines GL per group may be differently set on the basis of a touch time and a driving period.

Each of the aforementioned plurality of stages may output a gate pulse signal to one of the plurality of gate lines G1 to GLn in synchronization with one clock signal CLK.

In addition, the plurality of stages each may be provided with a high source voltage VDD from a high voltage source, a VGL from a low voltage source, a forward voltage FWD and a reverse voltage REV and all dummy stages each may be provided with the touch enable signal.

<Circuit Diagram of N-th Stage>

Figure 20:
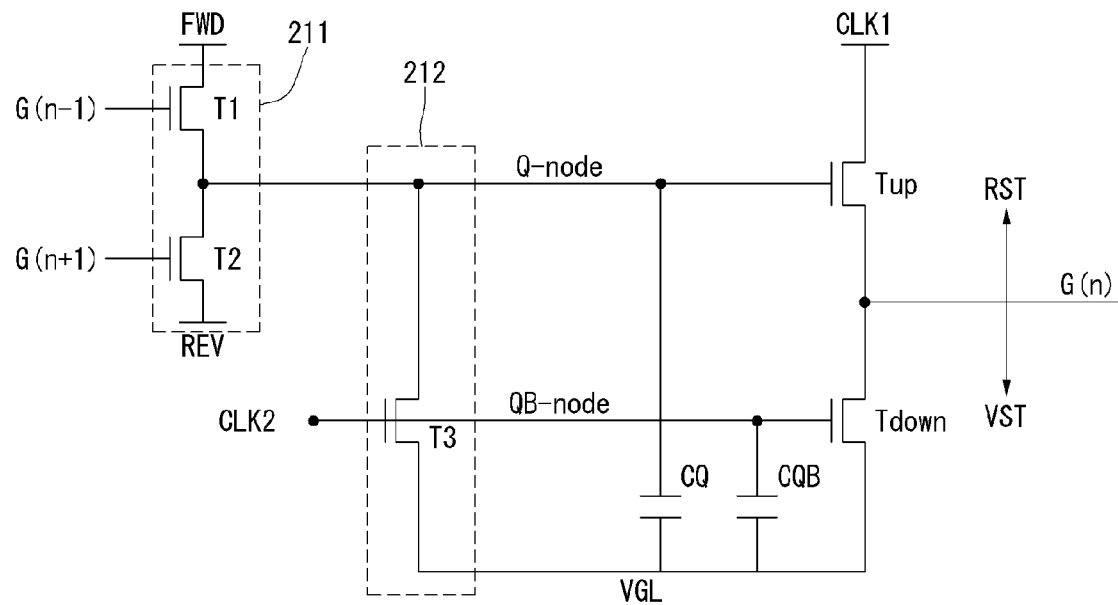
FIG. 20 is a circuit diagram of an N-th stage constituting a shift register according to an embodiment of the present invention.

FIG. 20 is a circuit diagram of the N-th stage constituting the shift register according to an embodiment of the present invention.

Referring to FIG. 20, the N-th stage is not a standby stage or a dummy stage and one of stages which charge Q nodes and sequentially outputs gate pulse signals in synchronization with an input clock signal for a display time. The N-th stage may include a pull-up transistor Tup, a pull-down transistor Tdown, a first capacitor CQ and a second capacitor CQB and additionally include a charging/discharging unit 211 and a Q-node stabilizer 212.

The aforementioned elements of the N-th stage are coupled as follows. The pull-up transistor Tup has a gate terminal coupled to a Q node, a drain terminal coupled to a first clock signal CLK1 supply terminal, and a source terminal coupled to the output terminal G (n) of the N-th stage. The pull-down transistor for stably discharging the output terminal during a discharge time has a gate terminal coupled to a QB node, a drain terminal coupled to the output terminal G (n) of the N-th stage, and a source terminal coupled to an input terminal of a VGL. The first capacitor CQ may be coupled to the QB node and the input terminal of the VGL. The second capacitor CQB may be coupled to the Q node and the input terminal of the VGL.

The charging/discharging unit 211 may charge or discharge the Q node. The charging/discharging unit 211 may include first and second transistors T1 and T2. The first transistor T1 has a gate terminal coupled to the output terminal G (n−1) of the (N-1) th stage, a drain terminal coupled to an input terminal of a forward voltage FWD and a source terminal coupled to the Q node. The second transistor T2 has a gate terminal coupled to the output terminal G (n+1) of the (N+1) th stage, a drain terminal coupled to an input terminal of a reverse voltage REV and a source terminal coupled to the Q node.

The Q-node stabilizer 212 discharges the Q node and may include a third transistor T3. The third transistor T3 has a gate terminal coupled to the QB node, a drain terminal coupled to the Q node, and a source terminal coupled to the input terminal of the VGL. As shown, the QB node may be provided with a second clock signal CLK2 or may be coupled to a terminal to which a voltage for turning on the third transistor T3 is supplied in synchronization with the output signal of the next stage or Q-node discharge timing. The second clock signal may be a clock signal having a level and timing for controlling the third transistor T3 to be turned off when the first transistor T1 is turned on and thus the Q node is charged and to be turned on when the Q node is discharged immediately after the gate pulse signal is output to the corresponding output terminal according to bootstrap of the Q node.

Figure 21:
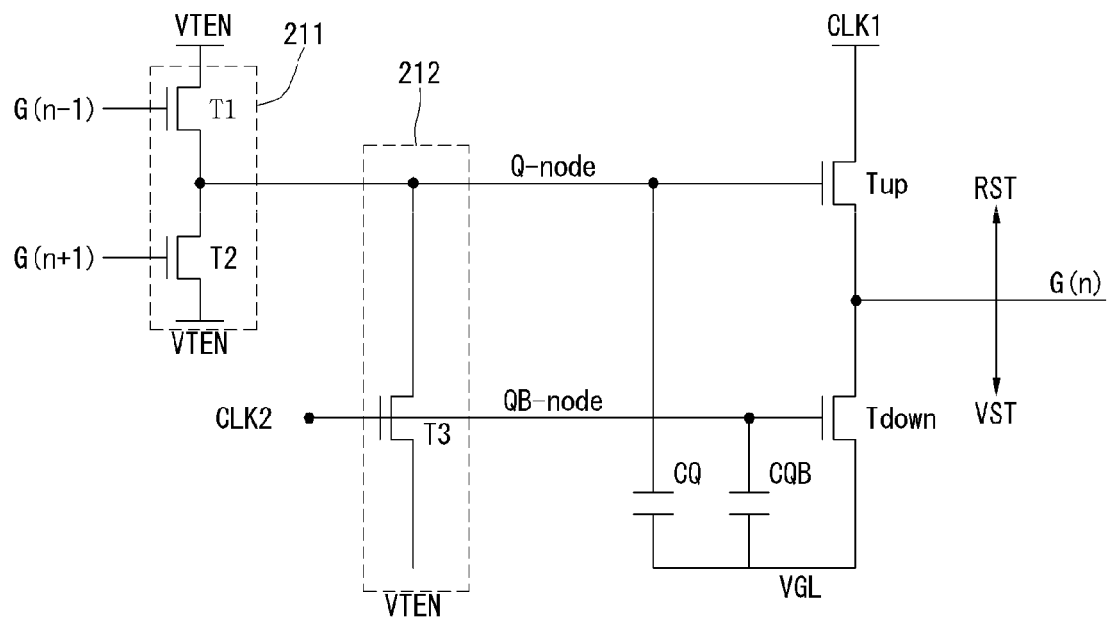
FIG. 21 is a circuit diagram of a standby stage.

FIG. 21 is a circuit diagram of a standby stage.

<Standby Stage>

Referring to FIG. 21, the standby stage, which is a standby stage applied to the shift register shown in FIGS. 16B or 17B, holds a charged Q-node voltage in a touch time and outputs a gate pulse signal through the output terminal thereof in synchronization with an input clock signal upon termination of the touch time. The standby stage may include a pull-up transistor Tup, a pull-down transistor Tdown, a first capacitor CQ, and a second capacitor CQB and additionally include a charging/discharging unit 211 and a Q-node stabilizer 212.

The elements of the N-th stage as the standby stage are coupled as follows. The pull-up transistor Tup has a gate terminal connected to a Q node, a drain terminal connected to a first clock signal CLK1 supply terminal, and a source terminal connected to the output terminal G (n) of the N-th stage. The pull-down transistor has a gate terminal coupled to a QB node, a drain terminal coupled to the output terminal G (n) of the N-th stage, and a source terminal coupled to an input terminal of a VGL. The first capacitor CQ may be coupled to the QB node and the input terminal of the VGL. The second capacitor CQB may be coupled to the Q node and the input terminal of the VGL.

The charging/discharging unit 211 may charge or discharge the Q node. The charging/discharging unit 211 may include first and second transistors T1 and T2. The first transistor T1 has a gate terminal coupled to the output terminal G (n−1) of the (N-1) th stage, a drain terminal coupled to an input terminal of the VTEN or a forward voltage FWD, and a source terminal coupled to the Q node. The second transistor T2 has a gate terminal coupled to the output terminal G (n+1) of the (N+1) th stage, a drain terminal coupled to the input terminal of the VTEN, and a source terminal coupled to the Q node.

The Q-node stabilizer 212 discharges the Q node and may include a third transistor T3. The third transistor T3 has a gate terminal coupled to a second clock signal CLK2 supply terminal, a drain terminal coupled to the Q node, and a source terminal coupled to the input terminal of the VTEN.

Figure 22:
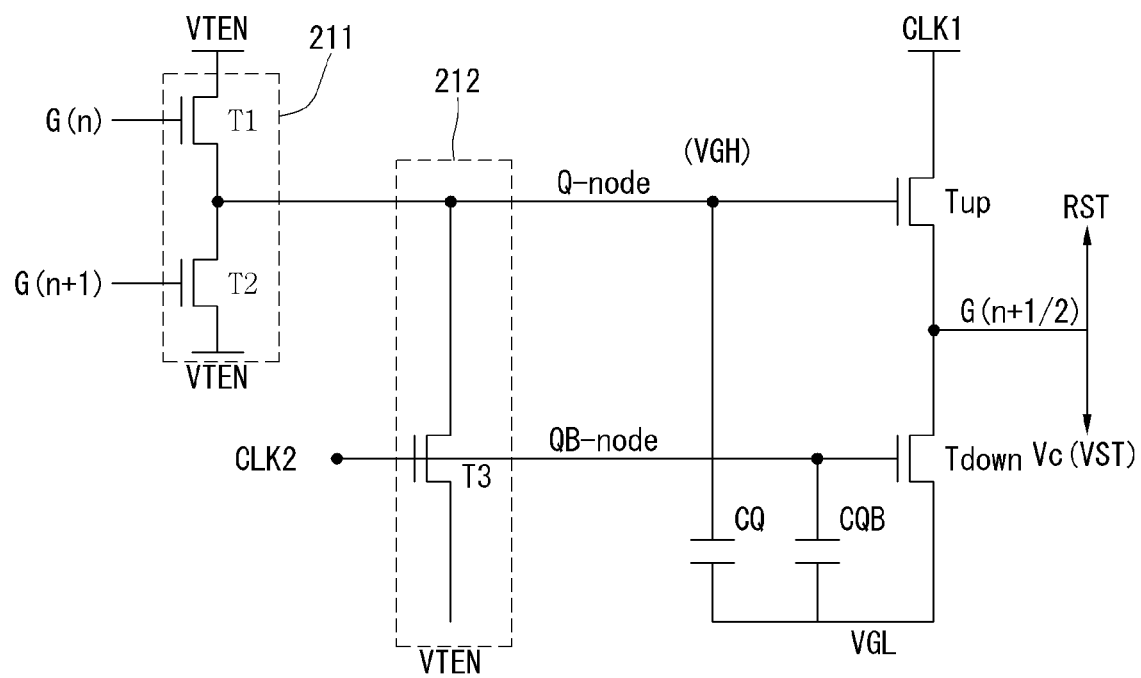
FIG. 22 is a circuit diagram of a dummy stage.

FIG. 22 is a circuit diagram of a dummy stage.

<Dummy Stage>

Referring to FIG. 22, the dummy stage is a stage applied to the shift register of FIGS. 16A or 17A and is arranged between the N-th stage and the (N+1) th stage. The dummy stage may include a pull-up transistor Tup, a pull-down transistor Tdown, a first capacitor CQ, and a second capacitor CQB and additionally include a charging/discharging unit 211 and a Q-node stabilizer 212.

The elements of the dummy stage are coupled as follows. The pull-up transistor Tup has a gate terminal connected to a Q node, a drain terminal connected to a first clock signal CLK1 supply terminal and a source terminal connected to the output terminal G (n+½) of the dummy stage. The pull-down transistor has a gate terminal coupled to a QB node, a drain terminal coupled to the output terminal G (n+½) of the dummy stage and a source terminal coupled to an input terminal of a VGL. The first capacitor CQ can be coupled to the QB node and the input terminal of the VGL. The second capacitor CQB can be coupled to the Q node and the input terminal of the VGL.

The charging/discharging unit 211 may charge or discharge the Q node. The charging/discharging unit 211 may include first and second transistors T1 and T2. The first transistor T1 has a gate terminal coupled to the output terminal G (n) of the N-th stage, a drain terminal coupled to an input terminal of the VTEN, and a source terminal coupled to the Q node. The second transistor T2 has a gate terminal coupled to the output terminal G (n+1) of the (N+1) th stage, a drain terminal coupled to the input terminal of the VTEN, and a source terminal coupled to the Q node.

The Q-node stabilizer 212 discharges the Q node and may include a third transistor T3. The third transistor T3 has a gate terminal coupled to a second clock signal CLK2 supply terminal, a drain terminal coupled to the Q node and a source terminal coupled to the input terminal of the VTEN.

<Forward and Reverse Driving Method for Stages>

Figure 23:
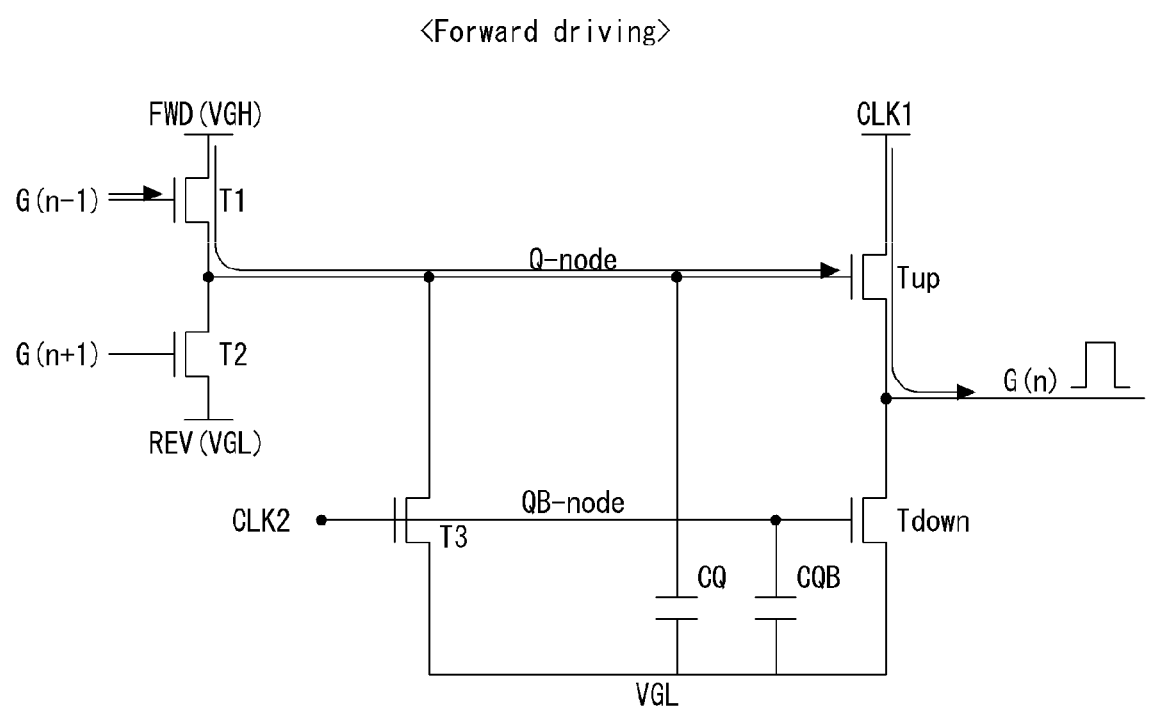
FIG. 23 is a diagram illustrating Q node charging and gate pulse output operations of the N-th stage in forwarding driving operation.
Figure 24:
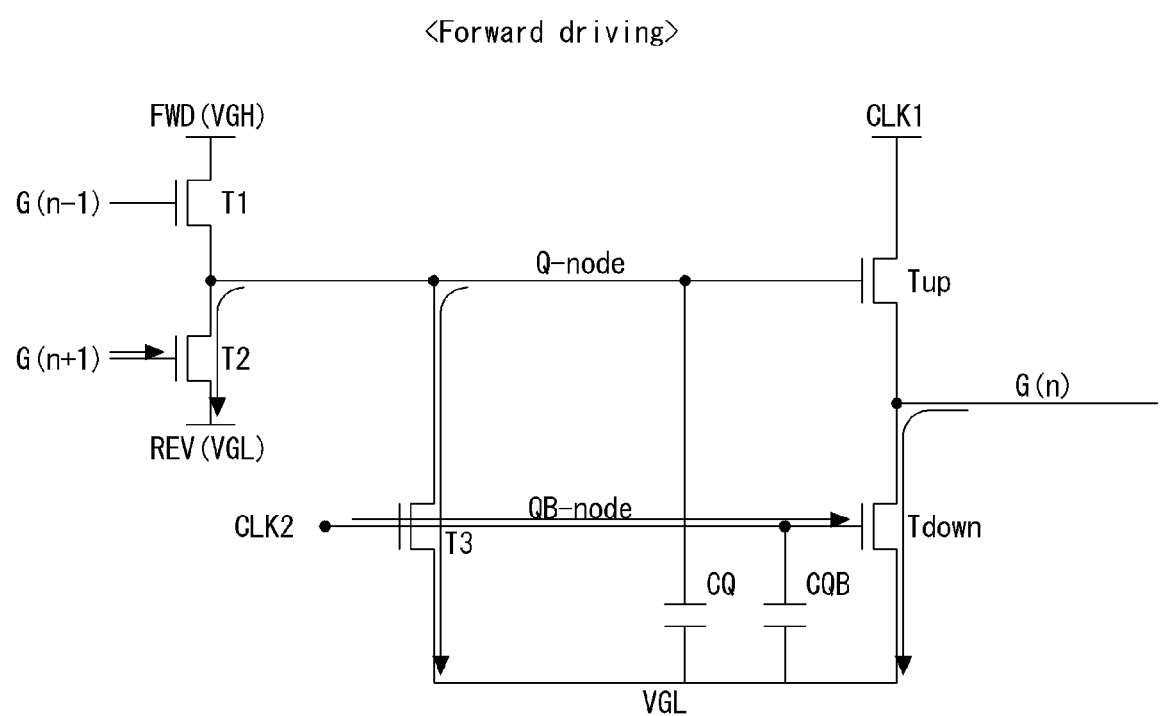
FIG. 24 is a diagram illustrating Q node discharging and QB node charging of the N-th stage in forwarding driving operation.

FIG. 23 is a diagram illustrating Q-node charging and gate pulse output operations of the N-th stage in forward driving operation and FIG. 24 is a diagram illustrating Q-node discharging and QB-node charging of the N-th stage in forward driving operation.

<Display Driving Period: Forward Driving>

For a first period of a display time T1, the first transistor T1 may be turned on by the output signal of the (N-1) th stage such that the forward voltage FWD is supplied to the Q node and the pull-up transistor Tup may be turned on according to bootstrap in response to a VGL level of the first clock signal CLK1 and thus gate pulses of a VGH level are output to the output terminal G (n) of the N-th stage.

For a second period following the first period in the display time T1, the second transistor T2 is turned on by the output signal of the (N+1) th stage such that the reverse voltage REV is supplied to the Q node so as to discharge the Q node, and the QB node is charged by a second clock signal CLK2 of a VTH level so as to turn on the third transistor T3 and the pull-down transistor Tdown such that the Q node and the output terminal G(n) of the N-th stage each may be discharged by the VGL.

Figure 25:
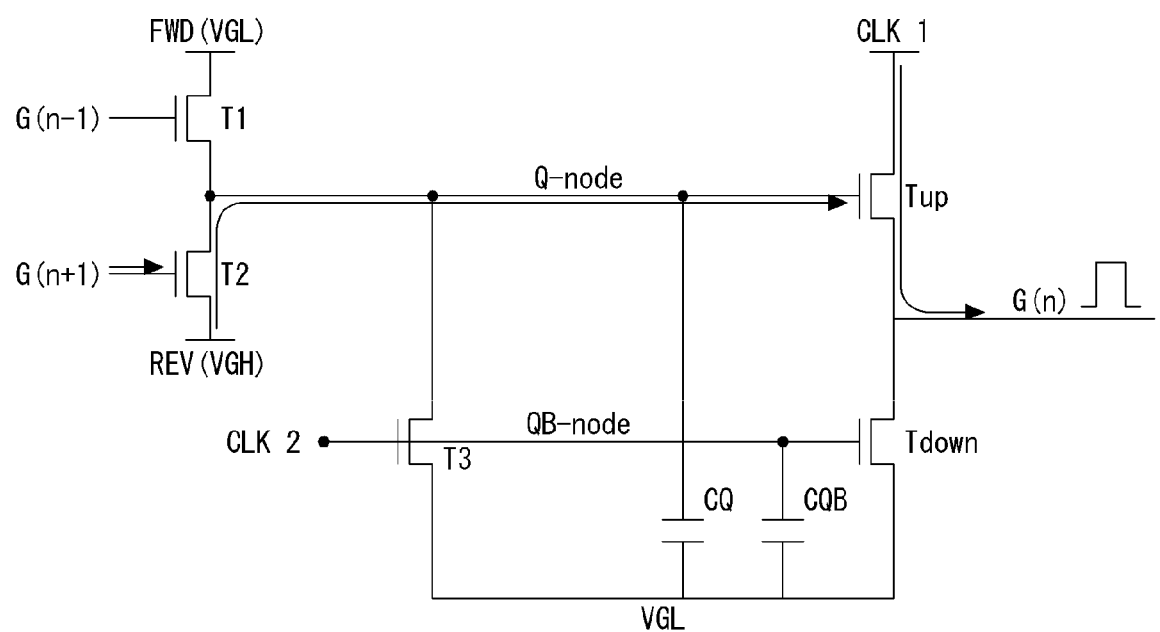
FIG. 25 is a diagram illustrating Q node charging and gate pule output operations of the N-th stage in reverse driving operation.
Figure 26:
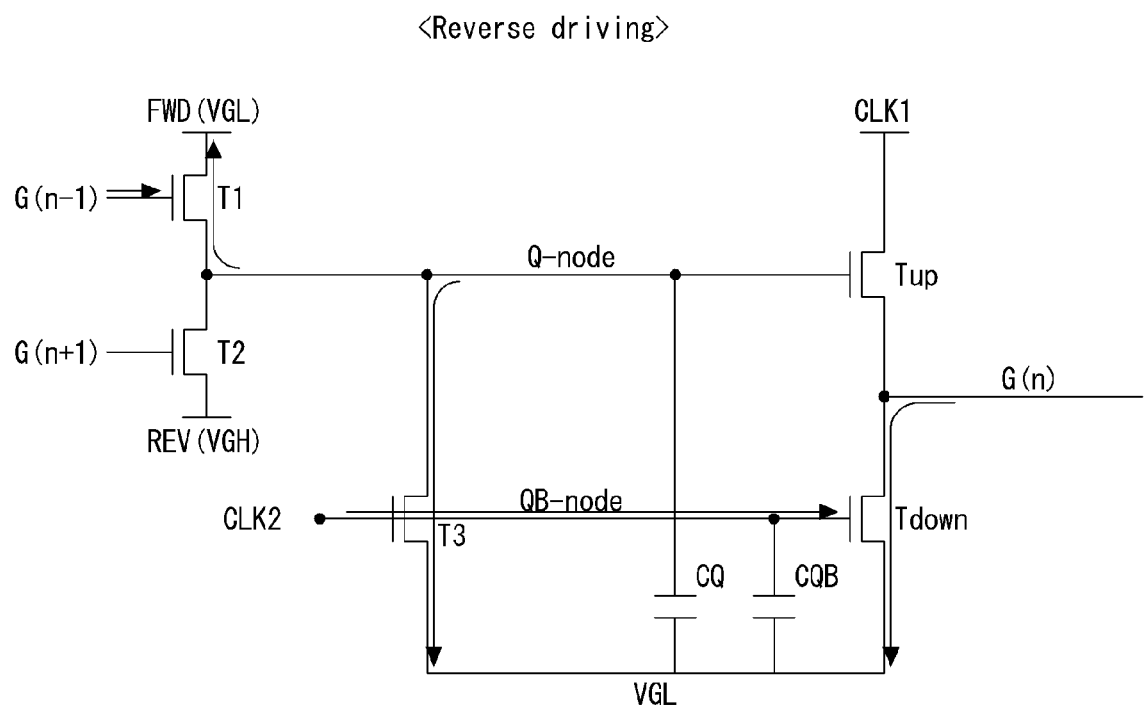
FIG. 26 is a diagram illustrating Q node discharging and QB node charging of the N-th stage in reverse driving operation.

FIG. 25 is a diagram illustrating Q node charging and gate pulse output operations of the N-th stage in reverse driving operation and FIG. 26 is a diagram illustrating Q-node discharging and QB-node charging of the N-th stage.

<Display Driving Period: Reverse Driving>

For the first period of the display time T1, the second transistor T2 may be turned on by the output signal of the (N+1) th stage such that the reverse voltage REV is supplied to the Q node and the pull-up transistor Tup may be turned on according to bootstrap in response to the VGL level of the first clock signal CLK1 and thus gate pulses of a VGH level may be output to the output terminal G (n) of the N-th stage.

For the second period following the first period in the display time T1, the first transistor T1 is turned on by the output signal of the (N−1) th stage such that the forward voltage FWD is supplied to the Q node so as to discharge the Q node, and the QB node is charged by a second clock signal CLK2 of a VGH level so as to turn on the third transistor T3 and the pull-down transistor Tdown such that the Q node and the output terminal G (n) of the N-th stage each may be discharged by the VGL.

Only one of the first and second transistors T1 and T2 may operate in forward operation or reverse operation of the gate driver circuit 200 to provide the forward voltage FWD or the reverse voltage REV to the Q node. The forward voltage FWD may be higher than the reverse voltage REV during forward driving operation and may be lower than the reverse voltage REV during reverse driving operation.

<Forward Driving Method for Standby Stage>

Figure 27:
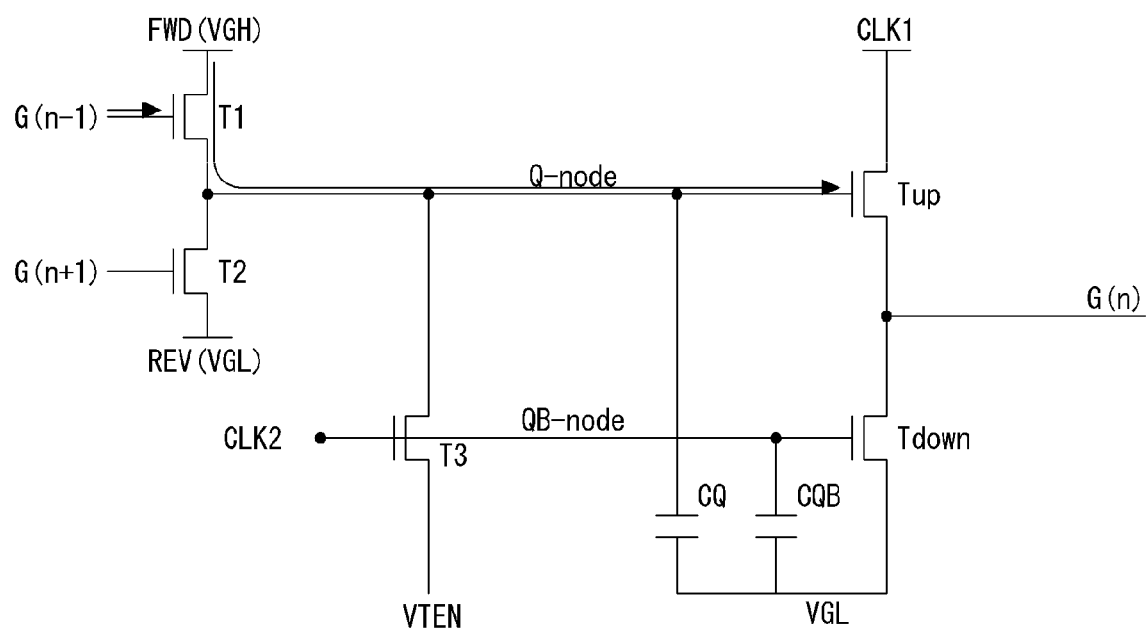
FIG. 27 is a diagram illustrating Q node charging of the N-th stage as a standby stage in forward driving operation.
Figure 28:
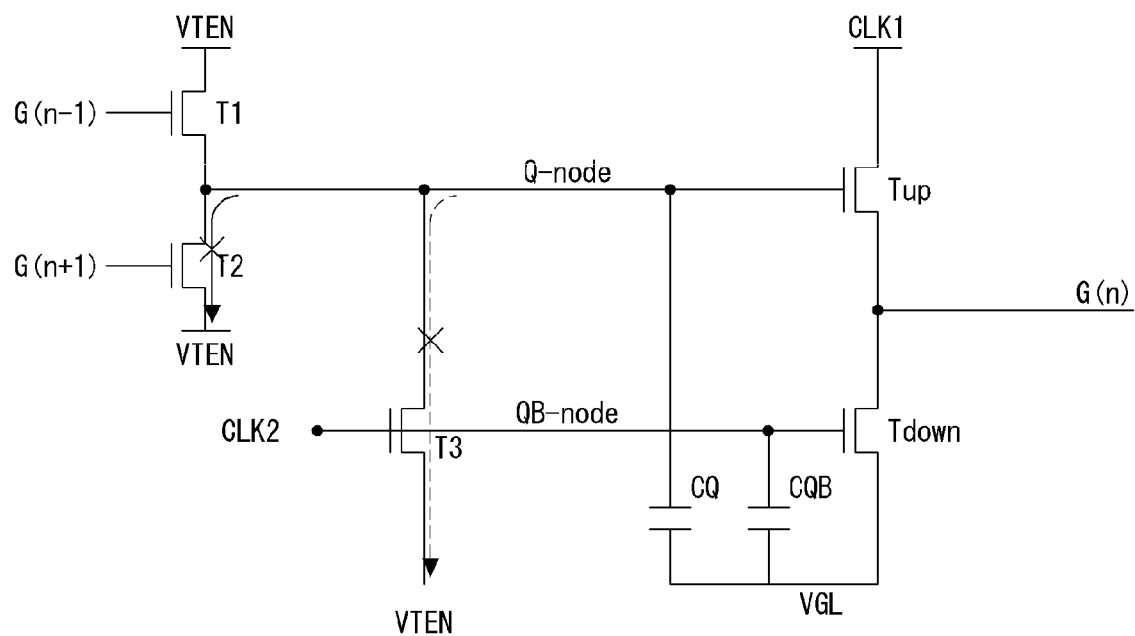
FIG. 28 is a diagram illustrating a holding time in which a Q node voltage is held.
Figure 29:
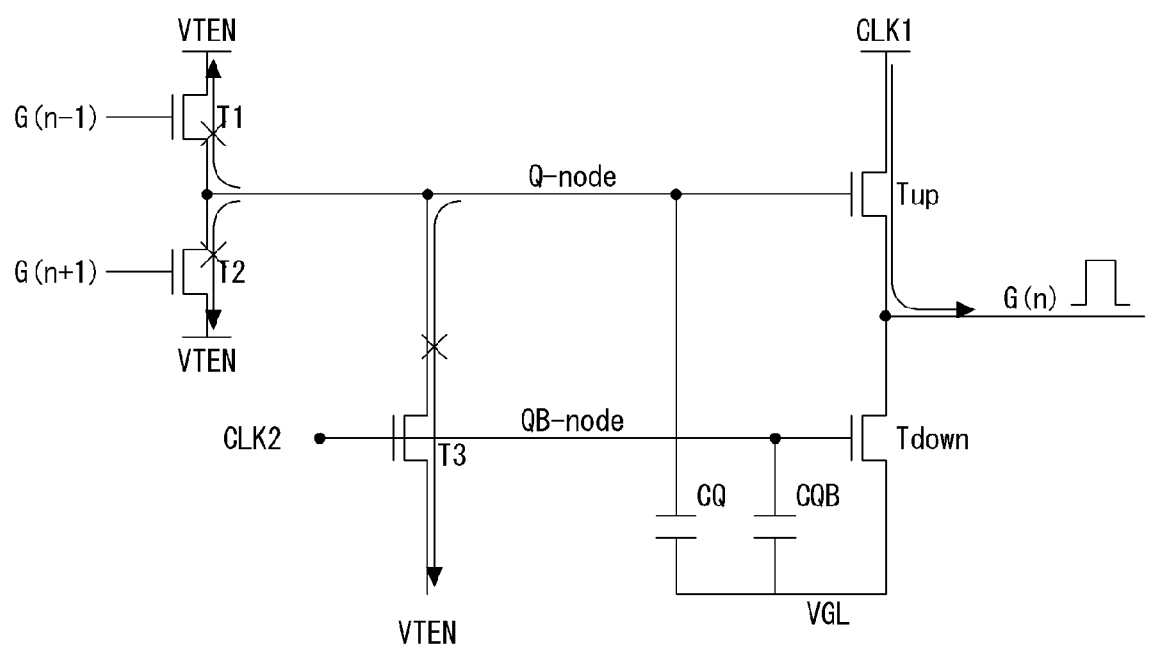
FIG. 29 is a diagram illustrating gate pulse output operation.
Figure 30:
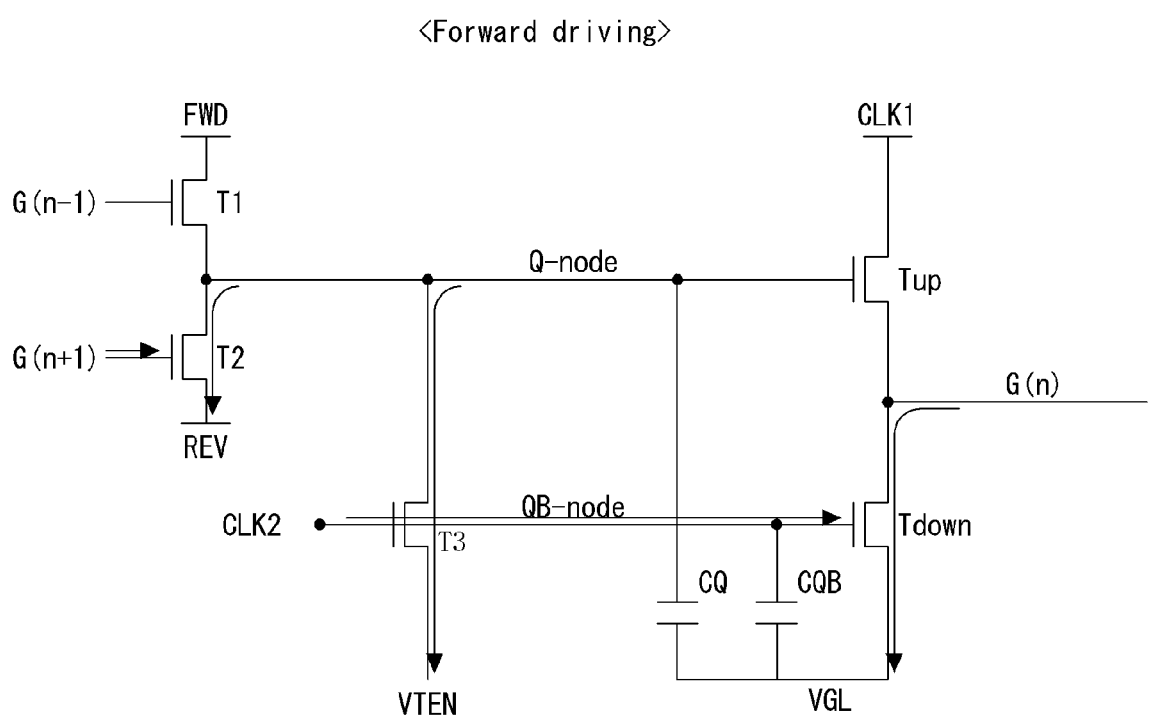
FIG. 30 is a diagram illustrating Q node and output terminal discharge operation.

FIG. 27 is a diagram illustrating Q-node charging of the N-th stage as a standby stage in forward driving operation, FIG. 28 is a diagram illustrating holding time in which a Q-node voltage is held and FIG. 29 is a diagram illustrating gate pulse output operation. FIG. 30 is a diagram illustrating Q-node and output terminal discharging operation and FIG. 31 is a diagram illustrating waveforms for driving the standby stage.

Q-Node Charge Time

Figure 31:
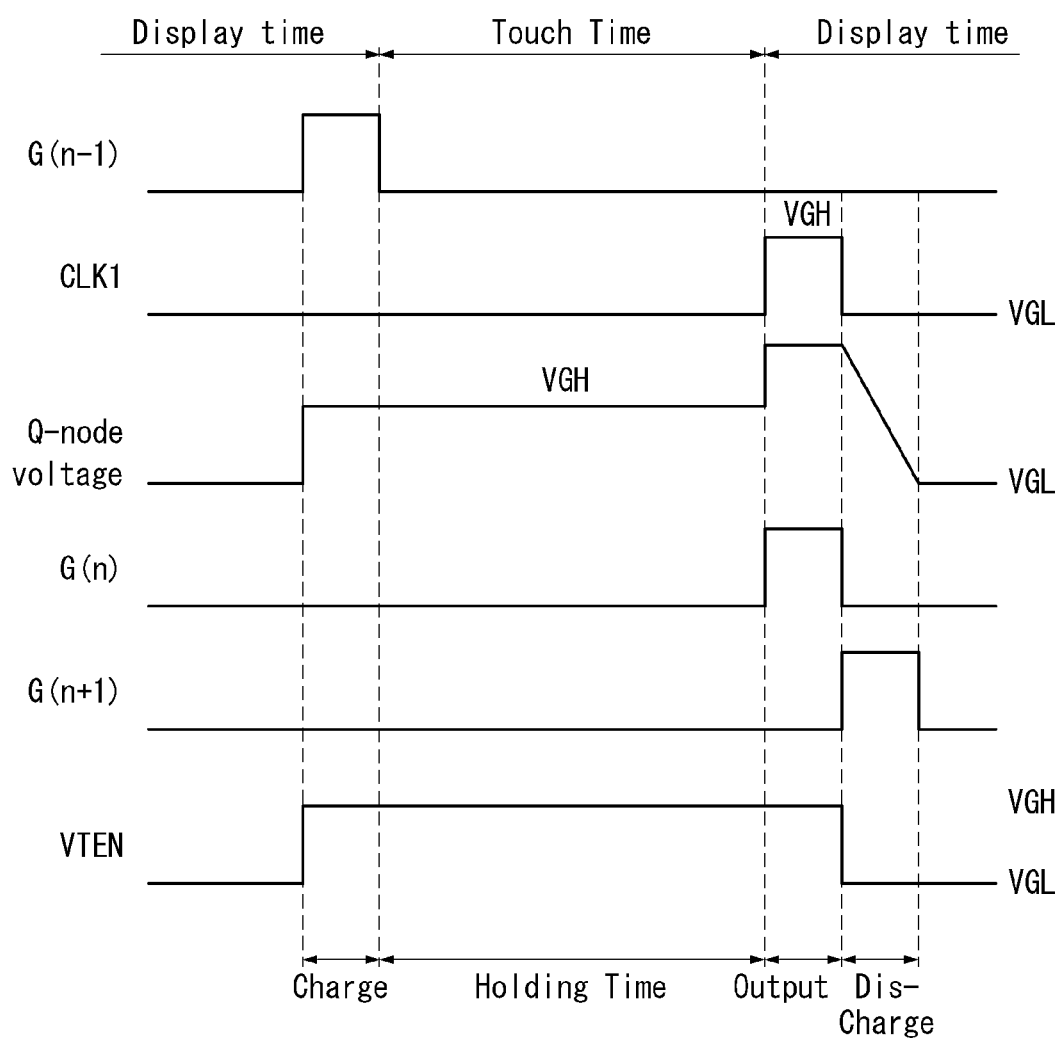
FIG. 31 is a diagram illustrating waveforms for driving a standby stage.

Referring to FIGS. 27 and 31, for the display time T1 immediately before touch time T2, the gate pulse signal may be output from the (N−1) th stage and the VTEN may be transited to a VGL level. Here, the first transistor T1 is turned on by the output signal of the (N−1) th stage and thus the VTEN transited to a VGH level is supplied to the Q node so as to charge the Q node.

Q-Node Voltage Holding Time (=Touch Time)

Referring to FIGS. 28 and 31, the touch time T2 is started and the voltage charged at the Q node is held for the touch time T2. Here, the VTEN holds the VGL level, and thus the VGL level voltage is supplied to the source terminal of the first transistor T1, the drain terminal of the second transistor T2, and the source terminal of the third transistor T3. In this manner, source-drain paths of the first, second and third transistors T1, T2 and T3, through which leakage current may flow, may be removed by supplying the high-level voltage to the source or drain terminals thereof.

Output Time

Referring to FIGS. 29 and 31, for display time T3 following the touch time T2, the pull-up transistor Tup is turned on according to bootstrap in response to the VGL level of the first clock signal CLK1 and thus a VGH level gate pulse can be stably output through the output terminal G (n) of the N-th stage.

Discharge Time

Referring to FIGS. 30 and 31, for discharge time following the output time, the second transistor T2 is turned on by the output signal of the (N+1) th stage such that the VGL level VTEN is supplied to the Q node so as to discharge the Q node, and the high-level second clock signal CLK2 charges the QB node to turn on the third transistor T3 and the pull-down transistor Tdown and thus the Q node and the output terminal G (n) of the N-th stage can be discharged by the VGL.

<Forward Driving Method for Dummy Stage>

Figure 32:
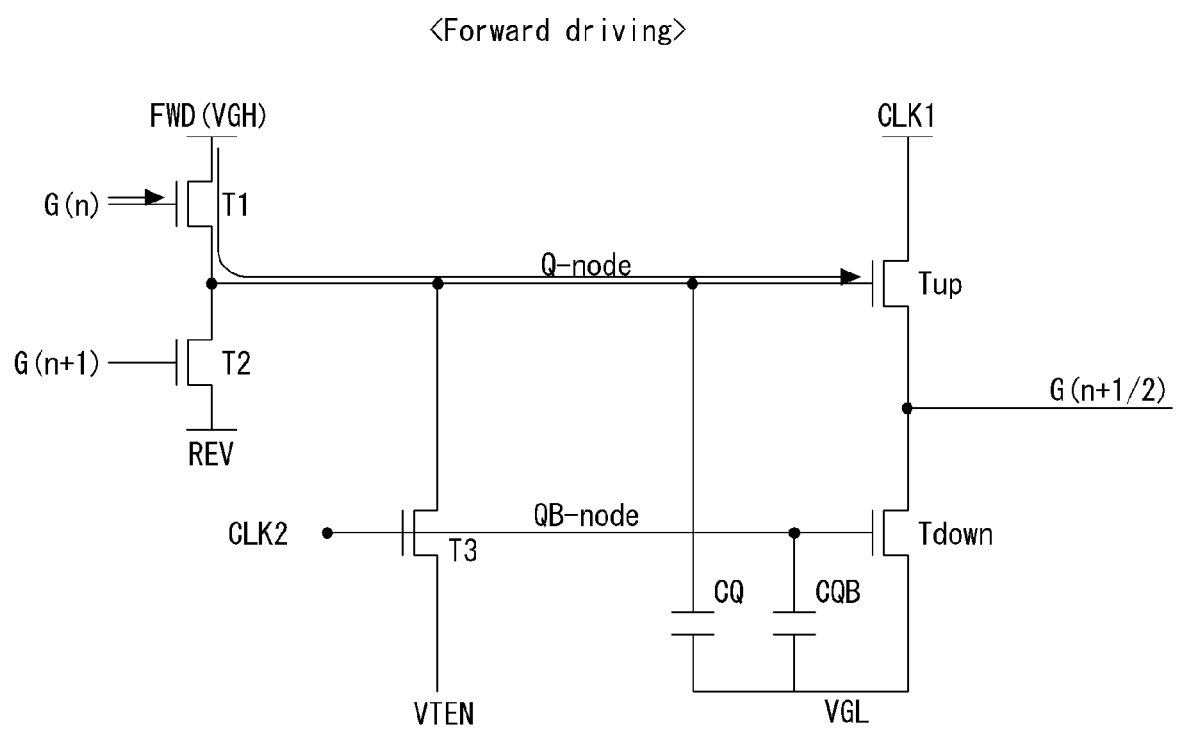
FIG. 32 is a diagram illustrating Q node charging of a dummy stage during forward driving operation.
Figure 33:
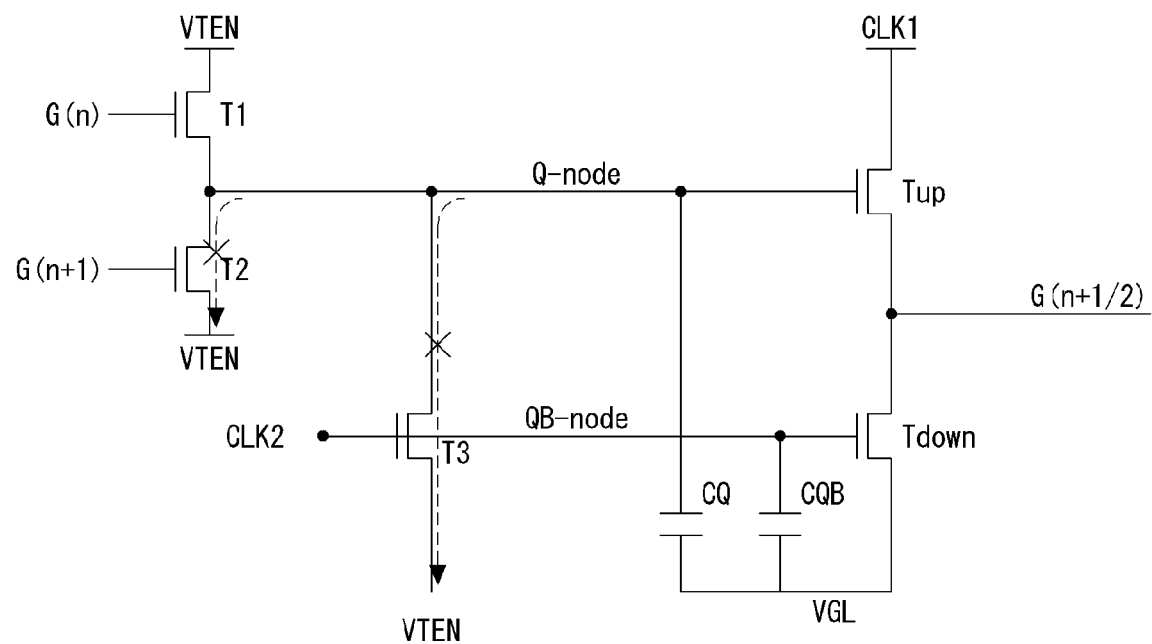
FIG. 33 is a diagram illustrating a holding time in which a Q node voltage is held.
Figure 34:
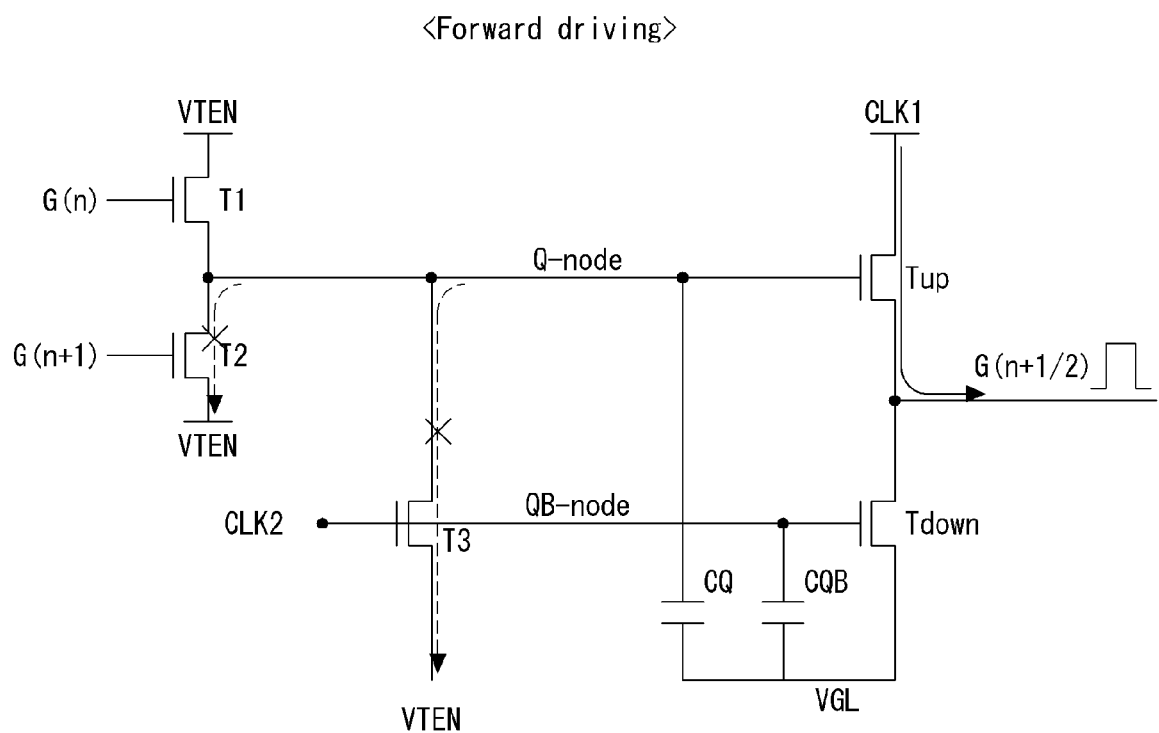
FIG. 34 is a diagram illustrating gate pulse output operation.
Figure 35:
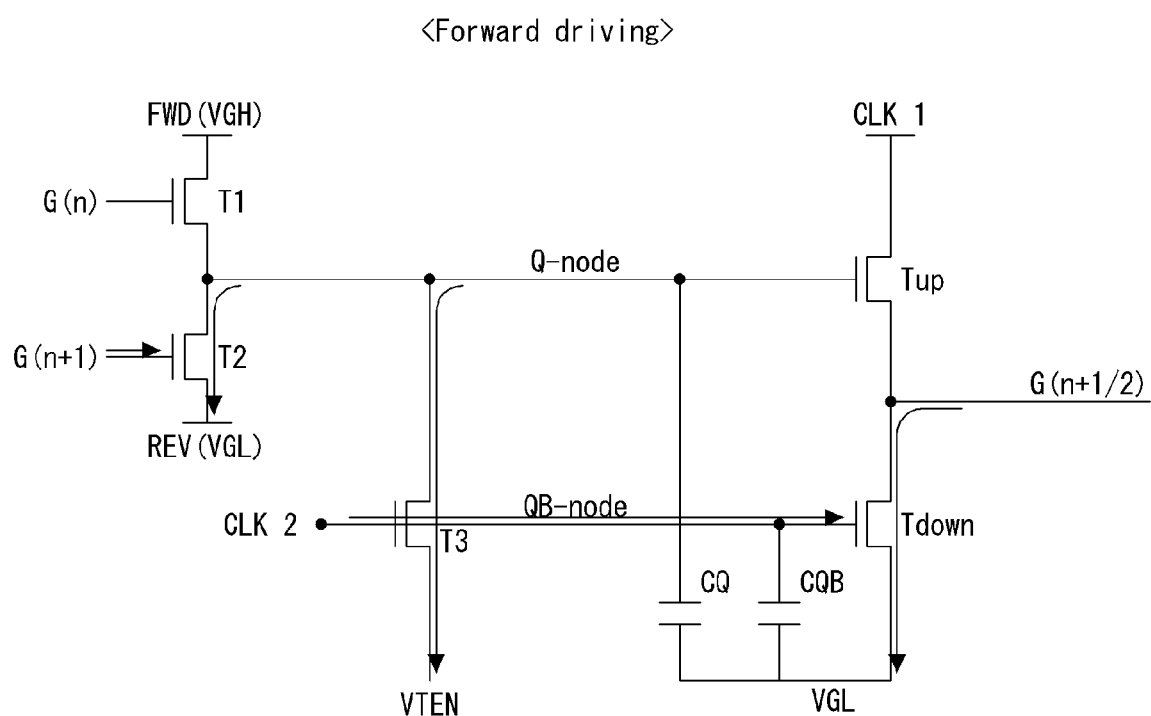
FIG. 35 is a diagram illustrating Q node and output terminal discharge operation.

FIG. 32 is a diagram illustrating Q-node charging of a dummy stage in forward driving operation, FIG. 33 is a diagram illustrating a holding time in which a Q-node voltage is held and FIG. 34 illustrates gate pulse output operation. FIG. 35 is a diagram illustrating Q-node and output terminal discharging operation and FIG. 36 is a diagram illustrating waveforms for driving the dummy stage.

Q-Node Charge Time

Figure 36:
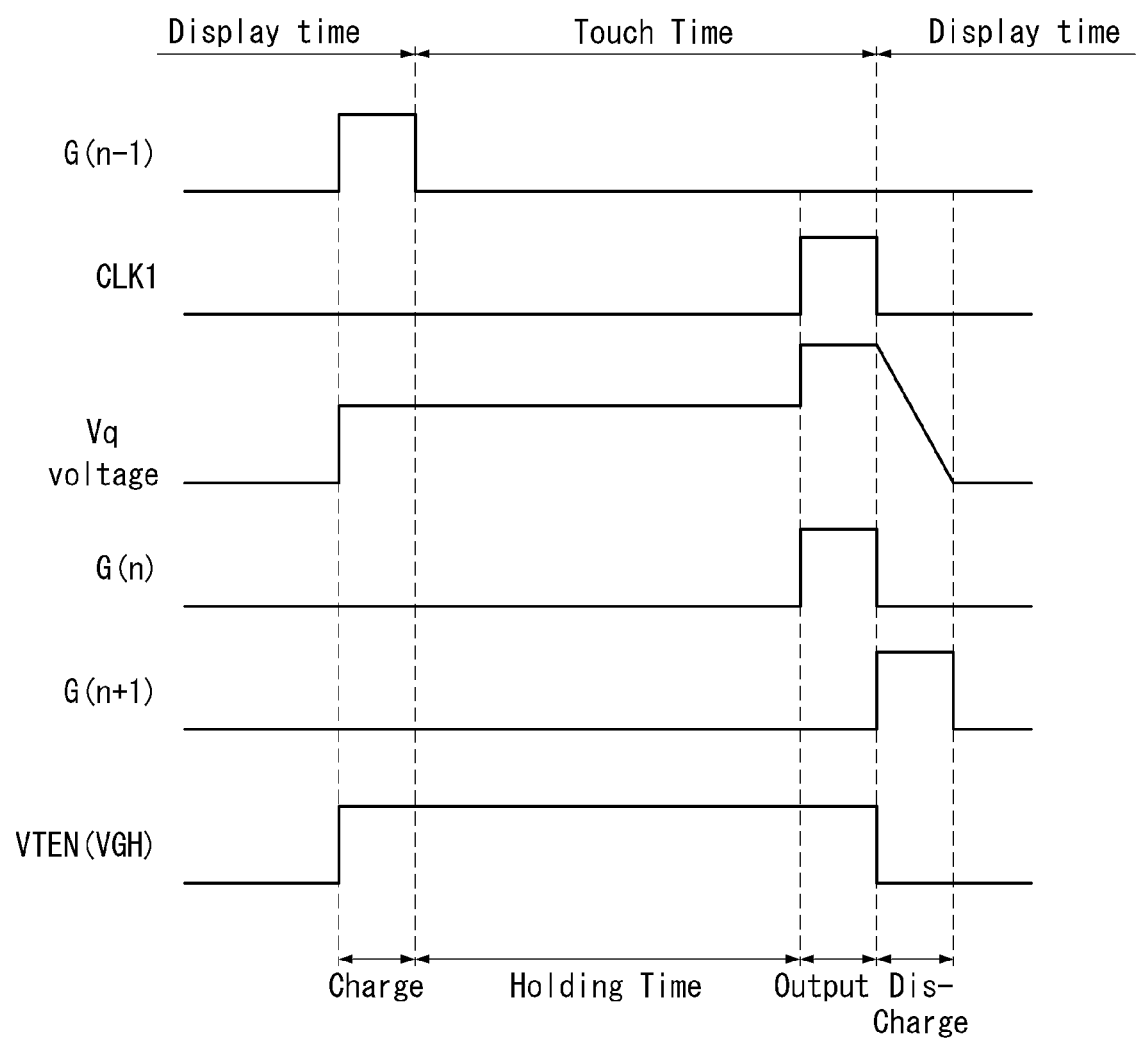
FIG. 36 is a diagram illustrating waveforms for driving the dummy stage.

Referring to FIGS. 32 and 36, for a first period of display time T1 immediately before touch time T3, the gate pulse signal may be output from the N-th stage and the VTEN may be transited to a VGH level. Here, the first transistor T1 is turned on by the output signal of the N-th stage and thus the VGH level VTEN is supplied to the Q node so as to charge the Q node.

Q-Node Voltage Holding Time (=Touch Time)

Referring to FIGS. 33 and 36, the touch time T2 is started and a voltage charged at the Q node is held for the touch time T2. Here, the VTEN holds the VGH level, and thus the VGH level voltage is supplied to the source terminal of the first transistor T1, the drain terminal of the second transistor T2 and the source terminal of the third transistor T3. In this manner, source-drain paths of the first, second and third transistors T1, T2, and T3, through which leakage current may flow, can be removed by supplying the high-level voltage to the source or drain terminals thereof.

Output Time

Referring to FIGS. 34 and 36, at the end of the touch time T3, the pull-up transistor Tup is turned on according to bootstrap in response to the VGL level of the first clock signal CLK1 and thus a VGH level carry signal Vc may be stably output through the output terminal G (n+½) of the dummy stage.

Discharge Time

Referring to FIGS. 35 and 36, for a discharge time in the display time T3 following the output time, the second transistor T2 is turned on by the output signal of the (N+1) th stage such that the VGL level VTEN is supplied to the Q node so as to discharge the Q node, and the second clock signal CLK2 of a VGH level charges the QB node to turn on the third transistor T3 and the pull-down transistor Tdown and thus the Q node and the output terminal G (n+½) of the dummy stage may be discharged by the VGL.

The Q node voltage holding time corresponds to the touch time in the case of the shift register according to the second and fourth embodiments, which uses a standby stage that is in a holding state for the touch time without including a dummy stage, whereas the Q node voltage holding time and the output time correspond to the touch time in the case of the shift register according to the first and third embodiments, which uses a dummy stage that is in a holding state for the touch time.

Figure 37:
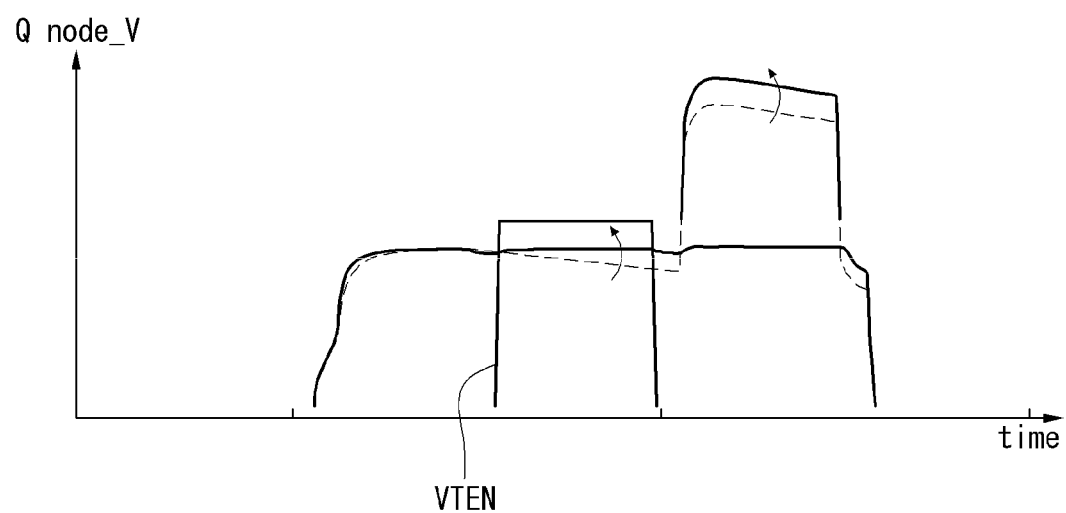
FIG. 37 is a diagram illustrating a waveform of a Q node voltage during operation of the standby stage or the dummy stage.

FIG. 37 is a diagram illustrating a waveform of a Q node voltage during operation of a standby stage or a dummy stage.

Referring to FIG. 37, the standby stage or dummy stage may hold the voltage of the Q node thereof and increase the voltage during bootstrapping by supplying the VGH level VTEN corresponding to the high-level source voltage to a source or drain terminal opposite the Q node on a source-drain path through which charges of the Q node can leak. Accordingly, a gate pulse signal of a VGH level is output and thus a dim phenomenon in which a horizontal line appears can be eliminated.

As described above, because a voltage of the Q node of the standby stage or dummy stage may be held during a touch time, the number of touch times for one frame can be reduced and the duration of a touch time can be increased. In addition, a clock time at high resolution can be secured by increasing a margin time between a display time and a touch time.

While the transistors of the stages and TFTs of the display panel 100 are N-type transistors in the above description, the present invention is not limited thereto and the first, second and third transistors T1, T2 and T3, the pull-up transistor Tup and the pull-down transistor Pdown of the stages and the TFTs of the display panel 100 may be P-type transistors. In this case, the logic high or low level of the aforementioned all signals becomes a logic low or high level. Accordingly, current leakage can be prevented by holding source-drain voltages of the first, second and third transistors T1, T2 and T3, thereby stably holding the voltage of the Q node of the corresponding stage during the touch time.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A display device, comprising:
   a display panel in which data lines and gate lines intersect and pixels are disposed in a matrix form, the display panel including touch sensors;
   a touch driver circuit that drives the touch sensors;
   a data driver circuit that supplies a data signal to the data lines;
   a gate driving circuit that supplies gate pulses to the gate lines using a shift register; and a timing controller that supplies data of an input image to the data driver circuit and that controls operation timing of the data driver circuit and the gate driving circuit, wherein the timing controller generates a touch enable signal that defines a display time and a touch time, the touch enable signal at a low level voltage during the display time and a high level voltage during the touch time, and the shift register comprises a stage in which the touch enable signal is input, wherein the stage comprises:

a Q node that controls a pull-up transistor; and a transistor comprising a drain directly connected to the Q node and a source directly connected to the touch enable signal, the high level voltage of the touch enable signal being applied to the source of the transistor during the touch time.

2. The display device of claim 1, wherein a voltage between a gate and the source of the transistor is lower than a threshold voltage of the transistor during the touch time, and the voltage between the drain and the source of the transistor is substantially zero during the touch time.

3. The display device of claim 2, wherein the touch enable signal comprises a high level time that rises to the high level voltage from a time later by a time within 1 clock pulse width than the start of the touch time and that falls to the low level voltage at a time within 1 clock pulse width immediately after the touch time terminates to be enlarged further than the touch time, and a lower level time of the touch enable signal is the display time, except for the high level time.

4. The display device of claim 2, wherein the touch enable signal comprises a high level time that rises to the high level voltage when the touch time starts and that falls to the low level voltage when the touch time terminates to have the same time as the touch time, and a low level time of the touch enable signal corresponds to the display time.

5. A driving device of a display device comprising a gate driver circuit that time-divides one frame into a display time and a touch time and that supplies gate pulses to a gate line of the display device according to a voltage of a Q node, the driving device comprising:

a timing control circuit that generates a touch enable signal that defines the display time and the touch time, the touch enable signal at a low level voltage during the display time and a high level voltage during the touch time, wherein the high level voltage of the touch enable signal is supplied to the gate driving circuit during the touch time, and the gate driving circuit comprises a transistor comprising a drain directly connected to the Q node and a source directly connected to the touch enable signal, the high level voltage of the touch enable signal being applied to the source of the transistor during the touch time.

6. The driving device of claim 5, wherein a voltage between a gate and the source of the transistor is lower than a threshold voltage of the transistor for the touch time, and a voltage between the drain and the source of the transistor is substantially zero during the touch time.

7. The driving device of claim 6, wherein the touch enable signal rises to the high level voltage from a time later by a time within 1 clock pulse width than the start of the touch time and falls to the low level voltage at a time within 1 clock pulse width immediately after the touch time terminates.

8. The driving device of claim 7, wherein the touch enable signal rises to the high level voltage when the touch time starts and falls to the low level voltage when the touch time terminates.

9. A method of driving a display device that divides one frame into a display time and a touch time to be time-division driven, the method comprising:

generating a touch enable signal that defines the display time and the touch time, the touch enable signal at a low level voltage during the display time and a high level voltage during the touch time; and reducing a voltage between a drain and a source of a transistor connected to a discharge path of a Q node by supplying the high level voltage of the touch enable signal during the touch time to the source of the transistor in a gate driver circuit that supplies gate pulses to a gate line of the display device according to a voltage of the Q node, the drain of the transistor directly connected to the Q node and the source of the transistor directly connected to the touch enable signal.

10. The method of claim 9, wherein a voltage between a gate and the source of the transistor is lower than a threshold voltage of the transistor for the touch time, and the voltage between the drain and the source of the transistor is substantially zero during the touch time.

11. A gate driver circuit that time-divides one frame into a display time and a touch time and in which a touch enable signal becomes a first level during the touch time or a second level during the display time, the gate driver circuit comprising:

a shift register, wherein an N-th (N is a positive integer) stage of the shift register comprises:

a first transistor controlled by an output signal of a previous stage to supply the touch enable signal having the first level to a Q node, the first transistor directly connected to the Q node;

a second transistor controlled by an output signal of a next stage to supply the touch enable signal having the second level to the Q node, the second transistor directly connected to the Q node; and a pull-up transistor controlled by a voltage of the Q node to output a first clock signal applied thereto to an N-th output terminal, wherein the first level is a high level and the second level is a low level, when the first transistor, the second transistor, and the pull-up transistor are N-type transistors, and the first level is the low level and the second level is the high level, when the first transistor, the second transistor, and the pull-up transistor are P-type transistors.

12. The gate driver circuit of claim 11, wherein the N-th stage is a dummy stage, and the display time includes a first display time prior to the touch time and a second display time following the touch time, wherein the Q node is charged during the first display time, a carry signal is output through the N-th output terminal during the touch time, and the Q node is discharged during the second display time.

13. The gate driver circuit of claim 11, wherein the display time includes a first display time prior to the touch time and a second display time following the touch time,
wherein the Q node is charged during the first display time, and gate pulses are output to the N-th output terminal for during the second display time.

14. The gate driver circuit of claim 12, wherein the N-th stage further includes a third transistor controlled by the voltage of the Q node to supply the touch enable signal to the Q node.

15. The gate driver circuit of claim 14, further comprising a pull-down transistor controlled by a voltage of a QB node to discharge the N-th output terminal.

16. A touchscreen integrated display device, comprising:
the gate driver circuit according to claim 11;
a panel displaying images; and
a touch driver circuit for sensing touch applied to the panel,
wherein the panel includes a plurality of pixels grouped into a plurality of pixel groups, a plurality of pattern electrodes one-to-one corresponding to the plurality of pixel groups, and sensing lines for respectively connecting the pattern electrodes to the touch driver circuit.

17. The touchscreen integrated display device of claim 16,
wherein the N-th stage is a dummy stage, and the display time includes a first display time prior to the touch time and a second display time following the touch time,
wherein the Q node is charged during the first display time, a carry signal is output to the N-th output terminal during the touch time, and the Q node is discharged during the second display time.

18. The touchscreen integrated display device of claim 16, wherein the display time includes a first display time prior to the touch time and a second display time following the touch time,
wherein the Q node is charged during the first display time, and gate pulses are output to the N-th output terminal during the second display time.

19. The touchscreen integrated display device of claim 17,
wherein the N-th stage further includes a third transistor controlled by a voltage of a QB node to supply the touch enable signal to the Q node.

20. The touchscreen integrated display device of claim 16, wherein the gate driver circuit further comprises a pull-down transistor controlled by the voltage of a QB node to supply a low-level voltage to the N-th output terminal.

* * * * *